United States Patent [19]
Ariav

[11] Patent Number: 4,875,198
[45] Date of Patent: Oct. 17, 1989

[54] INTRUSION DETECTION APPARATUS

[75] Inventor: Arie Ariav, Kochav Michael, Israel

[73] Assignee: I.D. Tech Ltd., Israel

[21] Appl. No.: 255,119

[22] Filed: Oct. 7, 1988

[51] Int. Cl.[4] ............................................. G08B 13/18
[52] U.S. Cl. ........................................ 367/93; 340/529
[58] Field of Search .................. 367/93, 136; 340/528, 340/544, 552, 529

[56] References Cited

U.S. PATENT DOCUMENTS

| | | | |
|---|---|---|---|
| 3,997,866 | 12/1976 | Taylor | 367/93 |
| 4,023,135 | 5/1977 | Hammura | 367/93 |
| 4,112,419 | 9/1978 | Kinoshita | 367/93 |
| 4,114,146 | 9/1978 | Inoue | 367/93 |
| 4,197,528 | 4/1980 | Gibson | 367/93 |
| 4,326,272 | 4/1982 | Rittenbach | 367/93 |
| 4,347,590 | 8/1982 | Heger | 367/93 |
| 4,382,291 | 5/1983 | Nakauchi | 367/93 |
| 4,499,564 | 2/1985 | Sirai | 367/93 |
| 4,639,902 | 1/1987 | Leverance et al. | 367/93 |
| 4,755,973 | 7/1988 | Meier et al. | 367/93 |

*Primary Examiner*—Michael J. Tokar
*Attorney, Agent, or Firm*—Lerner, David, Littenberg, Krumholz & Mentlik

[57] ABSTRACT

An intrusion detector and method of operating the detector is disclosed. The detector comprises a means including an antenna for transmitting spaced pulses of radiation energy of a given frequency throughout a region to be protected. Means are also provided for receiving the radiation energy reflected from the protected region. The reflected radiation energy is received between adjacent spaced transmitted pulses in the form of an AC analog signal at the given frequency, the peaks and valleys of which signal vary in amplitude with time. Means are also provided for allocating a portion of the time occurring between transmitted pulses into a plurality of time segments, each of which segments is long enough to correspond to a plurality of cycles of the analog signal. The detector further includes: means for integrating the plural cycles in each of the time segments to arrive at an integral value for each of the time segments; means for converting the integral values into corresponding digital values; means for storing the digital values in memory; means for comparing the stored digital values obtained from the reflected energy from the first transmitted pulse with the corresponding digital values obtained from the reflected energy of an adjacent second transmitted pulse; means for storing the absolute differences obtained between corresponding integral values for each of the time segments; and, means responsive to predetermined changes in the absolute differences for a predetermined number of time segments for initiating an intrusion signal in the apparatus.

37 Claims, 12 Drawing Sheets

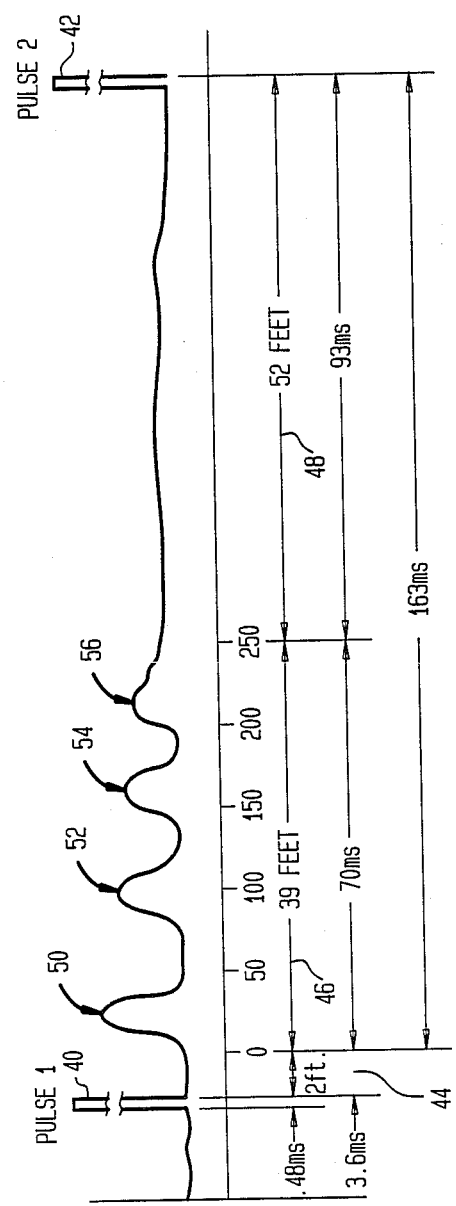

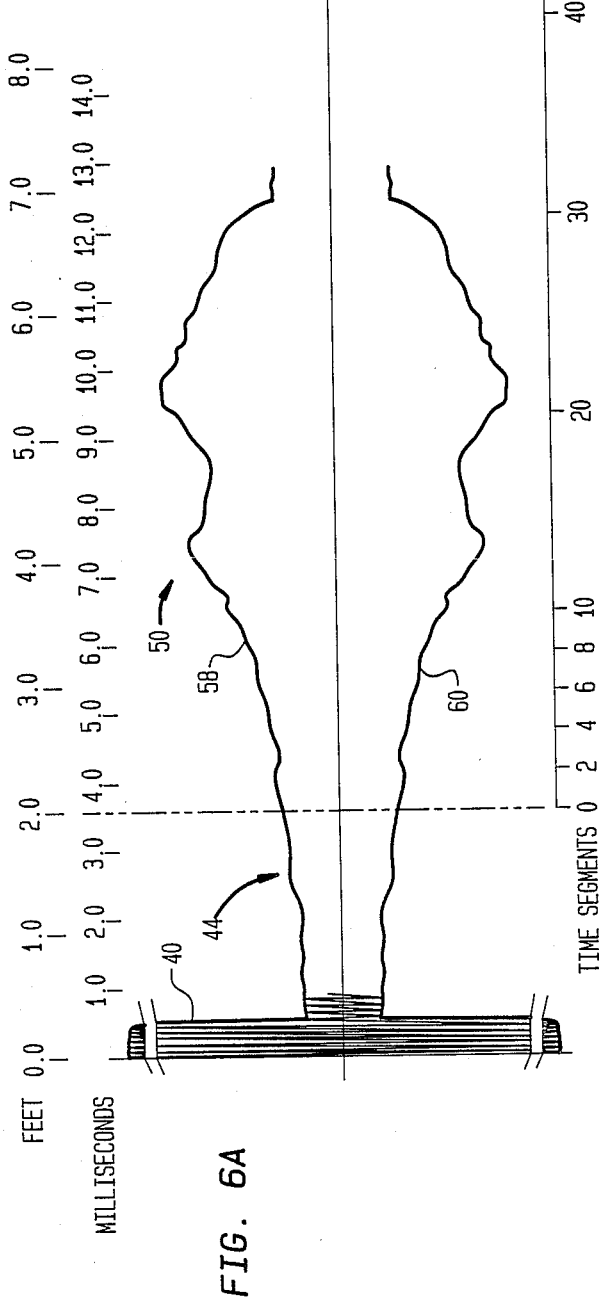
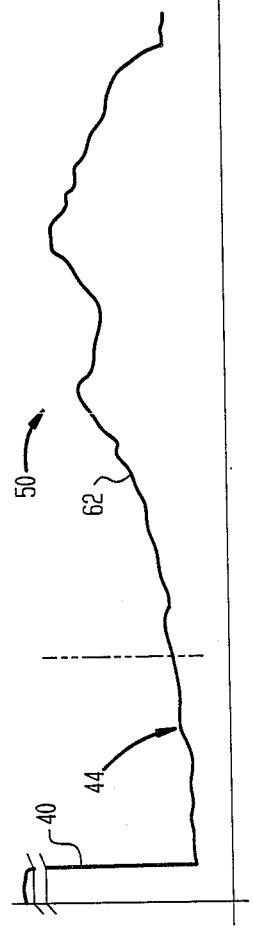
FIG. 6A
FIG. 6B

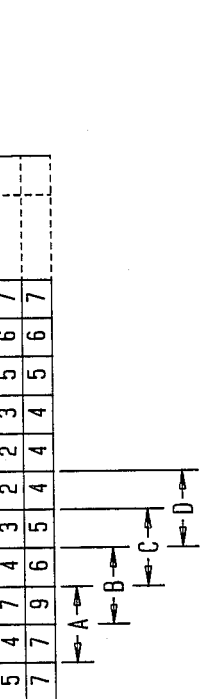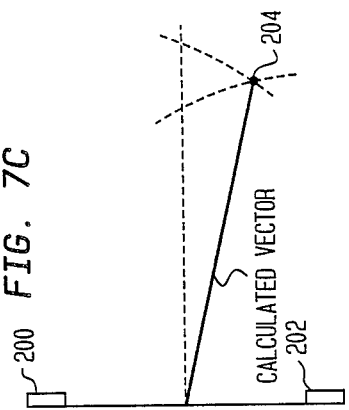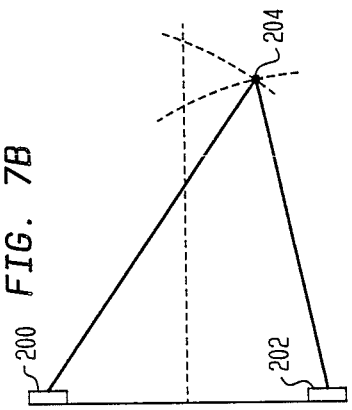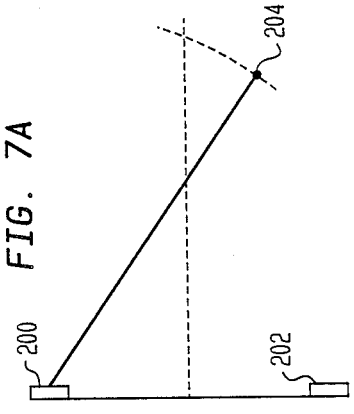

INTRUSION DETECTION APPARATUS

FIELD OF THE INVENTION

The present invention relates to detection apparatus generally and, more particularly, to intrusion detection apparatus that transmits pulses of radiation energy throughout a region to be protected and receives and analyzes radiation energy reflected from objects in the protected region.

BACKGROUND OF THE INVENTION

Various types of detectors are known for detecting intrusion to protected regions. These include, among others, infra-red detectors, which detect infra-red emissions from persons or other objects; microwave detectors, which normally detect doppler signals produced by the motion of an object in an electromagnetic field containing microwave energy; and, ultrasonic detectors, which emit ultrasonic energy pulses intermittently to the protected region, form a reference pattern of reflections from the protected region, compare a current reflected pattern with the reference pattern, and activate an alarm when the two patterns are significantly different.

Typical examples of ultrasonic intrusion detectors which operate in the manner indicated above are U.S. Pat. No. 4,382,291, dated May 3, 1983, U.S. Pat. No. 4,499,564, dated Feb. 12, 1985 and U.S. Pat. No. 4,639,902, dated Jan. 27, 1987. Such ultrasonic intrusion detectors generally suffer from common disadvantages relating to the fact that they tend to generate false alarms due to spurious noises (e.g., ringing telephones, bells, buzzers and the like; noisy vehicles passing by near the protected region; moving air currents within the protected region; and, moving articles and personnel within the protected region).

It is, therefore a primary object of the present invention to provide an improved intrusion detection apparatus and method in which the number of false alarms generated by spurious noise and non-intruder-originated movements in the protected region is significantly reduced from the number of spurious false alarms generated by prior art ultrasonic intrusion detection apparatus and methods.

Another major object of the present invention is to provide an intrusion detection apparatus and method which employs real time integration in its control circuitry to increase the probability of and to improve the repeatability of detection signals generated therein.

A further object of the present invention is to provide an intrusion detection apparatus and method wherein the user may exclude from protection selected zones within the protected region.

An additional object of the present invention is to provide an intrusion detection apparatus and method having the capability to automatically compensate for and ignore ambient environmental changes.

Yet another object of the invention is to provide an intrusion detection apparatus and method that can detect, and provide signals to inform the user of, attempts to mask or block the operation of the apparatus.

Further objects and advantages of this invention will become apparent as the following description proceeds.

SUMMARY OF THE INVENTION

Briefly stated, and in accordance with one embodiment of this invention there is provided an intrusion detection apparatus, comprising:
  (A) means including an antenna for transmitting spaced pulses of radiation energy of a given frequency throughout a region to be protected;
  (B) means for receiving radiation energy reflected from the protected region, the reflected radiation energy being received between adjacent spaced pulses in the form of an AC analog signal at the given frequency, the peaks and valleys of which signal vary in amplitude with time;
  (C) means for allocating a portion of the time occurring between transmitted pulses into a plurality of time segments each of which segments is long enough to correspond to a plurality of cycles of the analog signal;
  (D) means for integrating the plural cycles in each of the time segments to arrive at an integral value for each of the time segments;
  (E) means for converting the integral values into corresponding digital values;
  (F) means for storing the digital values in memory;
  (G) means for comparing the stored digital values obtained from the reflected energy of a first transmitted pulse with the corresponding digital values obtained from the reflected energy of an adjacent second transmitted pulse;
  (H) means for storing the absolute differences obtained between corresponding integral values for each of the time segments; and
  (I) means responsive to predetermined changes in the absolute differences for a predetermined number of time segments for initiating an intrusion signal in the apparatus.

In accordance with another aspect of the invention, an improved method of intrusion detection comprises the steps of:
  (A) transmitting spaced pulses of radiation energy of a given frequency throughout a region to be protected;
  (B) receiving reflected radiation energy from the protected region between adjacent spaced pulses, the reflected radiation energy being received in the form of an AC analog signal the peaks and valleys of which signal vary in amplitude with time;
  (C) allocating a portion of the time occurring between transmitted pulses into a plurality of time segments each of which segments is long enough to correspond to a plurality of cycles of the analog signal;
  (D) integrating the plural cycles in each of the time segments to arrive at an integral value for each of the segments;
  (E) converting the integral values into corresponding digital values;
  (F) storing the digital values in memories;
  (G) comparing the stored digital values obtained from reflected energy of a first transmitted pulse with the corresponding stored digital values obtained from the reflected energy of an adjacent second transmitted pulse;
  (H) storing the absolute differences obtained between corresponding integral values for each of the time segments; and (I) initiating an intrusion signal in the event changes of a predetermined amount occur in the absolute differences for a predetermined number of time segments.

BRIEF DESCRIPTION OF THE DRAWINGS

While the specification concludes with claims particularly pointing out and distinctly claiming the subject matter regarded as the invention herein, it is believed that the present invention will be more readily understood from the following description, taken in conjunction with the accompanying drawings, in which:

FIG. 15 is a time diagram of signals which are produced in the circuits of FIGS. 3A-3D;

FIGS. 6A-6I are time diagrams on an enlarged scale of an early portion of the time diagram of FIG. 5, showing the various stages of the processing of signals through the analog and digital portions of the circuits of FIGS. 3A-3D; and, FIGS. 7A-7C illustrate the use of multiple transducers of the type shown in FIG. 2 for determining the location of an intrusion signal by triangulation.

DETAILED DESCRIPTION OF THE INVENTION

Figure 1:
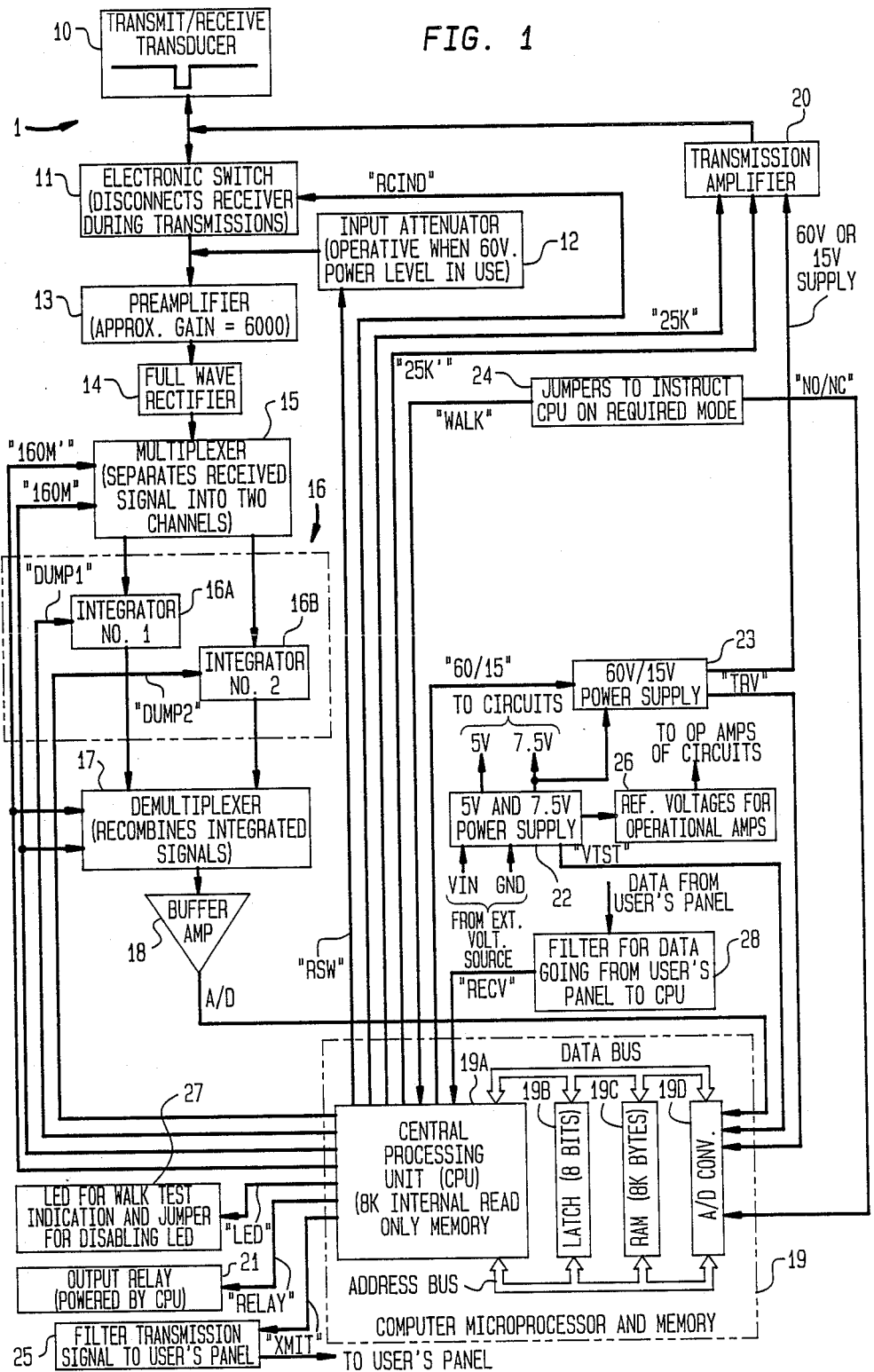
FIG. 1 is a generalized block diagram of the electrical control circuits employed in an intrusion detection apparatus in accordance with the present invention.

Referring to FIGS. 1 and 3A-3D, together, timing and control circuitry, shown generally at 1, has there been illustrated for controlling the operation of an intrusion detection apparatus, or detector, in accordance with a preferred embodiment of the present invention. The timing and control circuitry 1 includes a computer microprocessor and memory unit 19, hereinafter referred to as a microprocessor, which provides a desired pair of pulsed 25 kilohertz signals, indicated at 25K and 25K', to a transmission amplifier or transmitter 20 which, in turn, provides a corresponding pulse or burst of ultrasonic energy to a transmit/receive transducer or antenna 10. The ultrasonic energy provided is preferably in the range of 20-40 kilohertz and, for purposes of this discussion, has been indicated as being at 25 kilohertz. The transmission pulse or burst of ultrasonic energy is preferably a multiple cycle burst of ultrasonic energy and, for purposes of this discussion, it has been found desirable to have the transmission pulse comprise about 12 cycles of 25 kilohertz energy. At that frequency and with that number of cycles, the transmission pulse or burst comprises about a 0.48 millisecond pulse. Preferably, a pulse repetition rate of about 6 pulses per second is employed; however, other suitable pulse repetition rates may be utilized.

The transmit/receive transducer 10 serves as a transmitting and receiving antenna for the timing and control circuitry 1 and, preferably, comprises an ultrasonic transducer such as that available as Catalog Number R-25-18Y from Nippon Ceramic Co. Ltd. of 15-2 Nan-EI-Cho, Tottori-Shi 689-11, Japan. The transducer 10 receives radiation reflected from a region to be protected, for example the four rooms shown in FIG. 2, in the form of an AC signal and directs the received AC radiation signal through an electronic switch 11 to a preamplifier 13. Switch 11 serves to disconnect preamplifier 13 and the remaining receiving circuits from transducer 10 during the time that the transducer is receiving a transmission pulse from transmission amplifier 20. A signal generated in microprocessor 19 and indicated at RCIND, controls the action of switch 11.

The preamplifier 13, which has an approximate gain of about 6,000, amplifies the received AC radiation signal and passes it along to a full wave rectifier circuit 14, which converts the received AC radiation signal into a DC signal. The DC output of rectifier output 14 is led to a multiplexer 15 which is controlled by signals identified at 160M and 160M' supplied by microprocessor 19. The multiplexer 15 chops the received DC signal into timed segments and passes alternate ones of the time segments of the DC signal into one or another of two separate channels. The time segments employed each correspond in duration to a plurality of cycles of the radiation energy frequency employed in the transmitted pulses. Preferably, the time segments each have a duration that is equal to seven complete cycles of the frequency employed in the transmitted pulses. Thus, where the transmitted pulses comprise bursts of 25 kilohertz ultrasonic energy, the time segments of the multiplexer preferably are 280 microseconds in duration, as determined by signals 160M and 160M', which time corresponds to the time taken to transmit seven complete cycles of energy at a frequency of 25 kilohertz.

The multiplexed, time segments of the DC signal are alternately applied to first and second integrators 16A and 16B, respectively, of an integrator unit, shown generally at 16. The outputs of integrators 16A and 16B are controlled by respective signals, identified as DUMP1 and DUMP2, which are generated in microprocessor 19 and sent to integrators 16A and 16B. The integrators 16A and 16B alternately receive consecutive time segments of the DC signal from multiplexer 15, integrate these demultiplexer 17, which recombines the integrated received signal. Demultiplexer 17 is also controlled by the 160M and 160M' signals transmitted by microprocessors 19. The 160M and 160M' signals in time relationship with the DUMP1 and DUMP2 signals received by integrators 16A and 16B.

The stream of integrated values for the received signal, one value for each of the time segments of the received signal, is applied to a buffer amplifier 18 which, in turn, passes the stream of integrated, time segment signals along to an analog-to-digital converter unit 19D in the microprocessor 19. The arrangement of components 15-18 and 19A is such that when the integrated value from one integrator channel is being sampled and converted by the analog-to-digital converter, the incoming rectified DC signal is being accumulated and integrated by the integrator in the other integrator channel, and vice versa, in order to prevent a loss of signal information during the periods of analog-to-digital conversion. The microprocessor 19 includes a CPU or control processing unit 19A, a latch unit 19B and a RAM or a random access memory unit 19C, in addition to the analog-to-digital converter unit 19D, mentioned earlier.

The microprocessor 19, in addition to providing the 25K, 25K', 160M, 160M', RCIND, DUMP1 and DUMP2 signals referred to earlier, also provides a signal, identified as RSW, to an input attenuator 12 which is connected between the electronic switch 11 and the preamplifier 13. Input attenuator 12, when signalled to do so by signal RSW, serves to attenuate the input signal to preamplifier 13 by a factor of about 15. This is done when the timing and control circuits 1 of the intrusion detector are operating the detector at the higher of two selectable power levels at which it can operate. The two power levels are a 60 volt power level and a 15 volt power level. The power level is controlled by the microprocessor 19 via an output signal therefrom identified as "60/15". The signal 60/15 is fed to a 60 v/15 v power supply unit 23 which, turn, provides a 60 volt or a 15 volt supply to the transmission amplifier 20. The 60 v/15 v power supply unit 23 also provides an output signal, indicated at TRV, when it operates at the 60 volt level. This signal is fed back to the analog-to-digital converter 19D as part of the low voltage/high voltage power supply control circuitry.

A 5 volt and 7.5 volt power supply 22, which is provided with an input voltage of, for example, 9–18 volts across its terminals Vin and GND from an external voltage source or from a battery, provides a plurality of 5 volt and 7.5 volt output voltages that are distributed throughout the timing and control circuitry 1. The 7.5 volt output of power supply 22, among other things, serves as the input voltage to 60 v/15 v power supply 23 and as an input voltage to a reference voltage unit 26 that provides reference voltages to various of the operational amplifiers in the timing and control circuitry 1. Power supply unit 22 also provides a signal, identified as VTST, which is equal to Vin minus 0.7 volts, back to the analog-to-digital converter unit 19D. The signal VTST is representative of the input voltage Vin that is supplied to the power supply unit 22.

An output relay unit 21, which is controlled by the microprocessor 19 via a signal identified as RELAY, is employed to provide an output signal to an alarm or siren located on a user's panel at a location that may be remote from the intrusion detection apparatus. Similarly, a mode control unit 24 is provided which may be selectively controlled via an on/off switch SW1 (FIG. 3D) to provide a signal, identified as WALK, to the central processing unit 19A. This signal disables the alarm circuit of the detector while still allowing the LED light to light up to when detections are made to facilitate the user's checking of the coverage of the detector in the protected region. Mode control unit 24 also provides a signal, identified as NO/NC, to the analog-to-digital control unit 19D to direct the mode of operation of the intrusion detection apparatus. Jumpered jacks J2 (FIG. 3D) are employed to manually vary the NO/NC signal between 5 volts and ground in order to inform the microprocessor 19 which a normally open or normally closed relay is being used in unit 21 to connect the detector to the user's panel.

A filter unit 25 is provided to filter signals, identified as XMIT, from the central processing unit 19A enroute to the user's panel. The signal XMIT may comprise may available information (e.g., the distance to an intruder) that the user wishes to have sent to the user's panel from the detector.

A light emitting diode or LED unit 27 is employed for providing visual indications of the status of the intrusion detection apparatus. LED unit 27 includes jacks J1 (FIG. 3D) which may be jumpered between the LED circuit thereof and one or another of an input signal, identified as LED, from the central processing 19A, or a 7.5 volt input, which disables the LED unit.

A filter unit 28 is also employed for filtering data that is provided from the user's panel to the CPU unit 19A via a signal line, identified as RECV. The RECV signal may be used to provide instructions to the detector, for example, to stop sending information as to the distance to the intruder.

Figure 2:
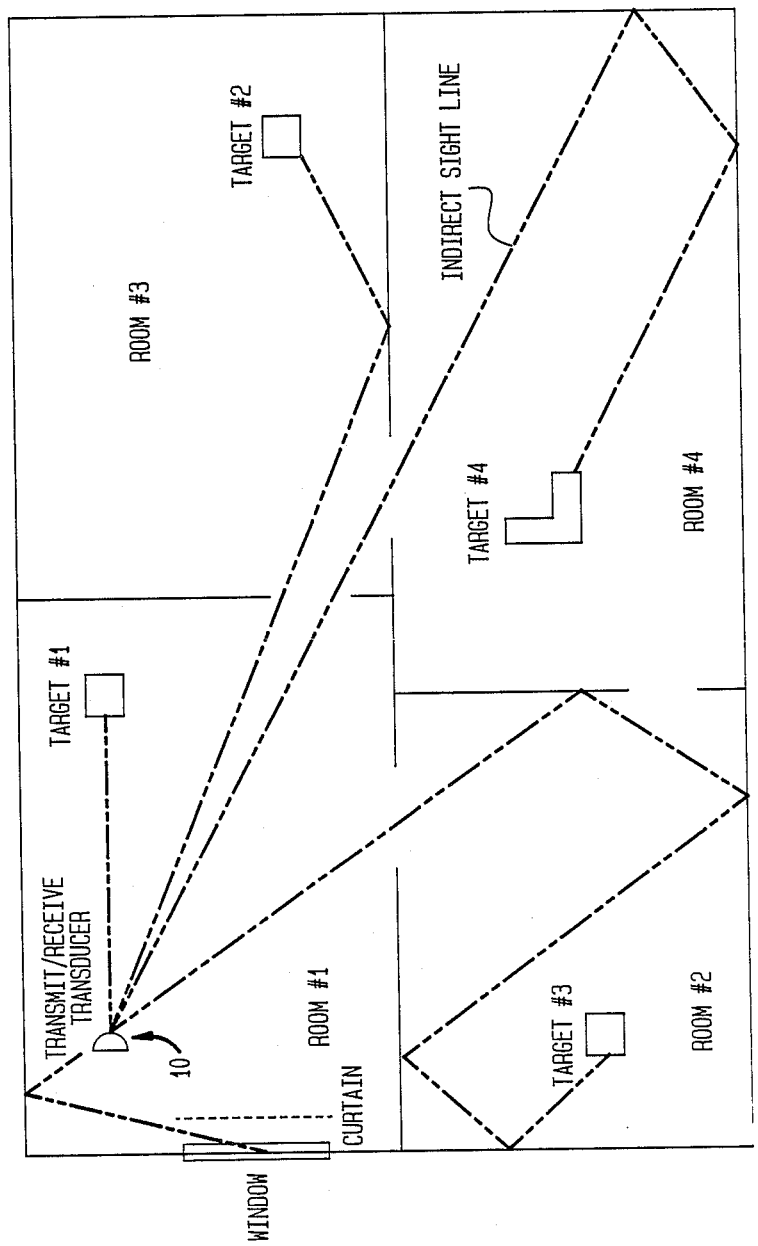
FIG. 2 illustrates one arrangement for positioning the intrusion detection apparatus of the present invention in a region to be protected.

Reference is now made to FIG. 2, which illustrates one arrangement by which the intrusion detector apparatus of the present invention can be employed in connection with an area to be protected. In this arrangement the transducer 10 is disposed at a desired location within a protected region which comprises, for example, a four room office. For simplicity, radiation and reflection paths for four specific targets are identified. It is particularly to be noted that the system of the present invention is not limited to line-of-site detection alone. It can also operate using return signals which have undergone multiple reflections such as those shown, for example, in connection with targets number 2, 3 and 4 in FIG. 2.

As may be clearly seen by reference to FIGS. 3A–3D, the electrical values and type designations of the various components employed in the timing and control circuitry 1 of the detector are provided in these figures. Thus, for example, transistors Q1, Q4 and Q8 are type 2N2222A transistors; transistors Q2 and Q3 are type MPS6521 transistors; transistor Q5 is a type MPSA56 transistor; transistor Q6 is a type BST74A transistor; and, transistor Q7 is a type MPSA06 transistor.

Figure 3A:
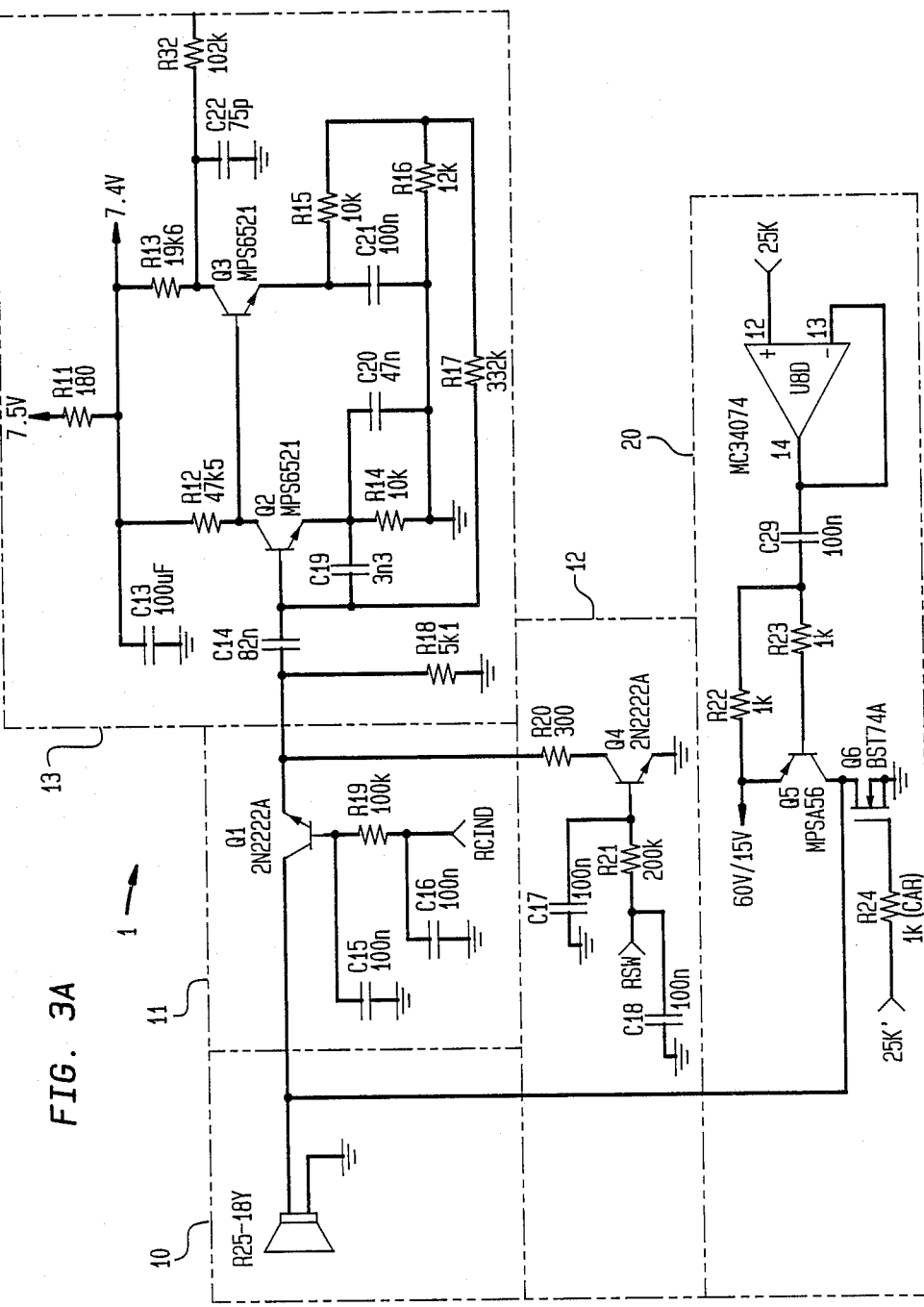
FIGS. 3A, 3B, 3C and 3D, together, constitute a schematic wiring diagram that corresponds to the block diagram of FIG. 1 for an intrusion detection apparatus in accordance with the present invention.
Figure 3B:
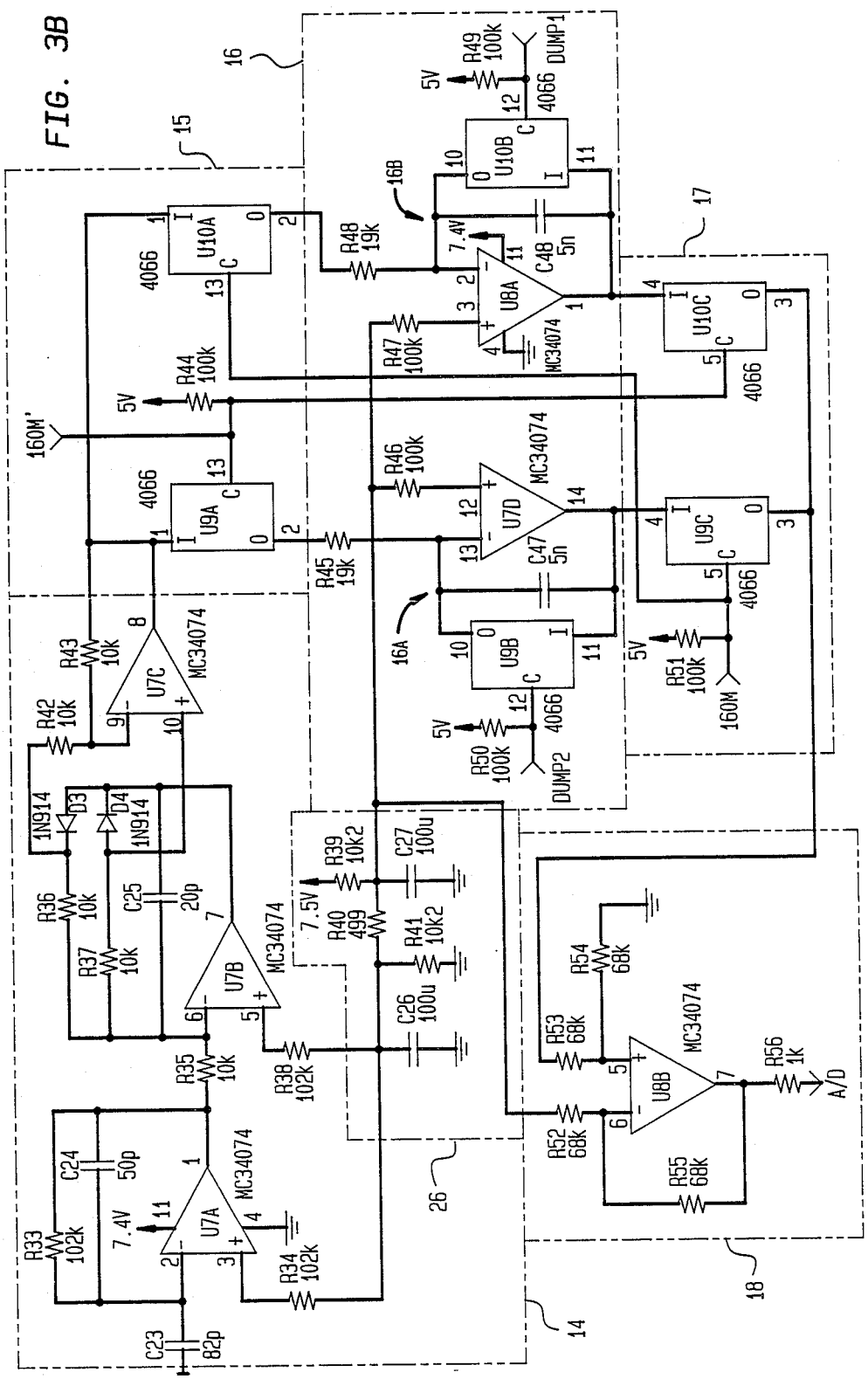
Figure 3C:
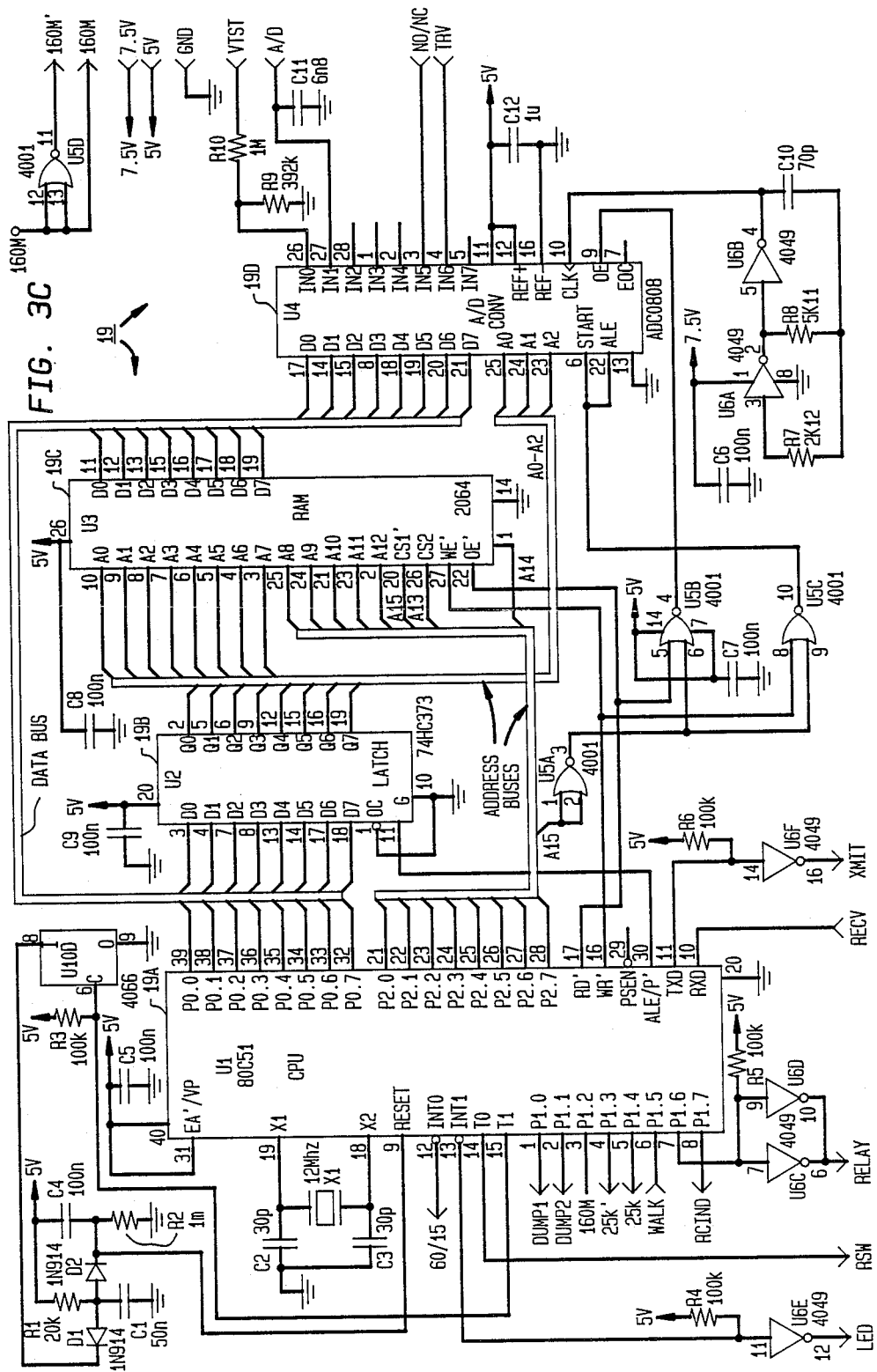

Similarly, the central processing unit 19A, also identified as U1 in FIG. 3C, preferably comprises an Intel type 80C51 central processing unit; the address latch 19B, also identified as U2 in FIG. 3C, preferably comprises a Motorola type 74HC373 8-bits address latch; the RAM 19C, also identified as unit U3 in FIG. 3C, preferably comprises a MHS 8-kilobyte type 2064C RAM unit; the analog-to-digital converter unit 19D, also identified as U4 in FIG. 3C, preferably comprises a Texas Instrument type ADC0808 analog-to-digital converter; units U5A–U5D preferably comprises Motorola type MC14001 NOR units; units U6A–U6F preferably comprise Motorola type MC14049 inverter units; units U7A–U7D and U8A–U8D preferably comprises Motorola type MC34074 low noise operational amplifiers; units U9A–U9D and U10A–U10D preferably comprise Motorola type MC14066 analog switches; and, units U11 and U12 preferably comprise Motorola type LM317 voltage regulators. In addition, diodes D1–D4, D6 and D8–D10 comprise IN914 type diodes; diode D5 comprises a light emitting diode, or LED; and diode D7 comprises a IN4002 type diode.

The values of the various resistors and capacitors employed in the timing and control circuitry 1 are as shown in FIGS. 3A–3D. The symbols "k" and "m" associated with the various resistors R1, R2 . . . Rn represent kilohms and megohms, respectively. When the symbol "k" or "m" is positioned between two numerical values, it indicates that such values are separated by a decimal point. The symbols "m", "u", "n" and "p" associated with the various capacitors C1, C2 . . . Cn represent millifarads, microfarads, nanofarads and picofarads, respectively. When they are positioned between two numerical values, they also indicate that such values are separated by a decimal point.

Referring to FIG. 3C, the DATA bus of computer microprocessor and memory unit 19 interconnects ports P0.0–P0.7 (terminals 39–32, respectively) of unit 19A with respective ports DO–D7 (terminals 3, 4, 7, 8, 13, 14, 17 and 18, respectively) of unit 19B, with respective ports D0–D7 (terminals 11–13 and 15–19, respectively) of unit 19C, and with respective ports D0–D7 (terminals 17, 14, 15, 8 and 18–21, respectively) of unit 19D.

Similarly, an ADDRESS bus of computer microprocessor and memory unit 19 interconnects ports P2.0–P2.7 (terminals 21–28, respectively) of unit 19A with respective ports A8–A12, A15, A13 and A14 (terminals 25, 24, 21, 23, 2, 20, 26 and 1, respectively) of unit 19C, as well as interconnecting port A15 (terminal 20) of unit 19C through inverters U6A and U6B to port OE (terminal 9) of unit 19D and through inverters U6A and U6C to ports START (terminal 6) and ALE (terminal 22) of unit 19D. In addition, it is noted that ports A0–A7 (terminals 10–3, respectively) of unit 19C are connected to respective ports Q0–Q7 (terminals 2, 5, 6, 9, 12, 15, 16 and 19, respectively) of unit 19B by an ADDRESS bus, and that ports A0–A2 (terminals 10–8, respectively) of unit 19C are connected via one of the ADDRESS buses to respective ports A0–A2 (terminals 25–23, respectively) of unit 19D in the computer microprocessor and memory unit 19. The various other connections employed in microprocessor unit 19 are self-evident from examination of FIG. 3C.

Referring now to FIG. 5, and assuming, first, that a pulse repetition rate of 6 transmission pulses per second has been selected and, second, that each transmission pulse or burst is a 12 cycle burst of 25 kilohertz ultrasonic energy, a representative time diagram of signals generated by, and occurring in, the timing and control circuitry of the detector has there been illustrated. Two of the transmission pulses, identified at 40 and 42, are shown in the time diagram of FIG. 5. The starting points of each of the pulses are separated from one another by a time period of about 167 milliseconds, which corresponds to a pulse repetition rate of 6 pulses per second. The 167 millisecond cycle time period includes a 0.48 millisecond period during which the 12 cycle 25 kilohertz pulse 40 is transmitted, followed by a selectable first listening period 44, in this case selected to be 3.6 milliseconds long, during which the detector listens for any reflections that might occur from within about a 2 foot radius of the transducer in order to determine whether or not any attempt has been made to mask the transmitted energy pulse (e.g., by covering the transducer with a shield, painting over the transducer, etc.). If a response occurs that exceeds the expected response during this time, an anti-masking alarm is triggered, warning the user that a asking attempt has been made.

Assuming that no masking attempt has occurred, the return echoes from the transmitted pulse start arriving at the transducer from that portion of the area under surveillance which extends beyond 2 feet from the transducer. The return echoes are received in the form of a plurality of superimposed 25 kilohertz analog signals whose peaks and valleys vary in amplitude with time, based on the amounts of primary and subsequent reflections of energy received from objects in the area. As indicated in FIG. 5, a second listening period 46, in this case arbitrarily selected as being about 70 milliseconds long and corresponding to the time during which echo reflections arrive at the transducer from a distance extending from 2 feet to about 41 feet from the transducer, is provided. This 70 millisecond period is preferably broken down into a plurality of individual time segments, each of which corresponds to and is in synchronism with the time segments generated by the multiplexer 15 (FIG. 3B), referred to earlier herein. Although 250 time segments have been illustrated in FIG. 5, it will be apparent that the time duration of the time segments employed and the number of time segments utilized in each pulse cycle can be arbitrarily selected to be any of many values within a wide range of values so long as they are correlated to one another and to the remaining portions of the timing and control circuitry 1. Preferably, however, the number of time segments utilized is within the range of 200–300 time segments and the duration of the time segments is within the range of from about 100 microseconds to about 500 microseconds. Assuming that 250 time segments of 280 microseconds duration have been selected, the ends of each of the time segments represent corresponding additional distances of about 1.874 inches (0.156 feet) from the transducer.

The remaining 93 milliseconds of the 167 millisecond full cycle constitutes a third listening period 48, during which any prolonged echo or ringing from the previous pulse is allowed to decay and during which the background noise level in the protected region is determined, in order to provide a background noise level datum plane for use in connection with listening periods following the next transmitted pulse 42.

Referring to FIG. 2 in conjunction with FIG. 5, it will be seen that primary ultrasonic energy reflections from targets Nos. 1, 2, 3 and 4 of FIG. 2 appear as respective peaks 50, 52, 54 and 56 in the second listening period 46 of FIG. 5. Numerous secondary or other indirect reflections of energy from these targets will also provide corresponding peaks (not shown) in the second listening period 46.

Figure 6C:
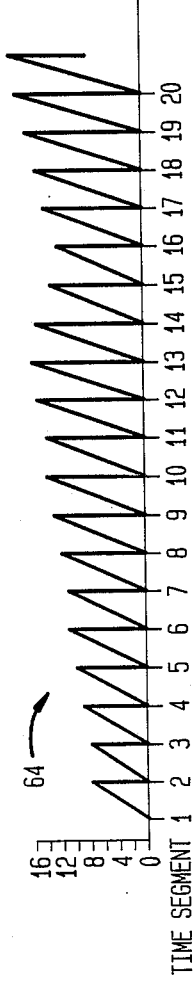
Figure 6D:
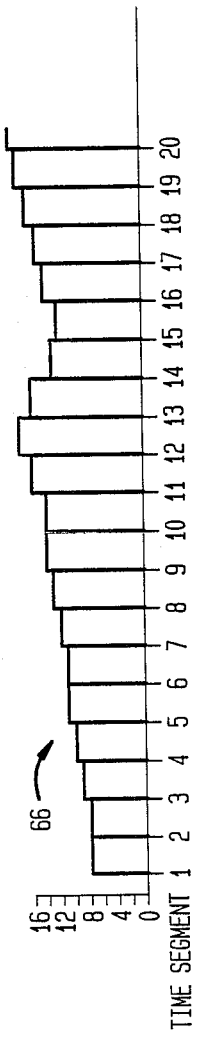

Referring now to FIGS. 6A–6D, which are time diagrams on an enlarged scale corresponding to an early portion of the time diagram of FIG. 5, the various stages of the processing of signals through the analog and digital portions of the circuits of FIGS. 3A–3D will now be further considered. As shown in FIG. 6A, the echo reflections of pulse 40 comprise a plurality of superimposed AC signals having an envelope defined by an upper portion 58 and a lower portion 60. The returning echo reflection signal is initially amplified by the preamplifier 13 (FIG. 3A) and then rectified by the rectifier circuit 14 (FIG. 3B) to arrive at the DC signal illustrated in FIG. 6B at 62. Alternatively, a conventional detector circuit can be used in place of the full wave rectifier 14 to provide a DC signal corresponding to the signal 62.

Following rectification, the multiplexer unit 15, integrator units 16A and 16B and demultiplexer unit 17 (FIG. 3B) respectively break down the rectified DC signal 62 into time segments, integrate the DC signals in the time segments and recombine the integrated signal values in the demultiplexer to provide the stream of integrated signal values 64 shown in FIG. 6C. The stream of integrated signal values then proceeds through the buffer amplifier 18 (FIG. 3B) and into the analog-to-digital converter 19D (FIG. 3C) where the integrated values are digitized to become the digital signals shown at 66 in FIG. 6D.

Figure 6E:
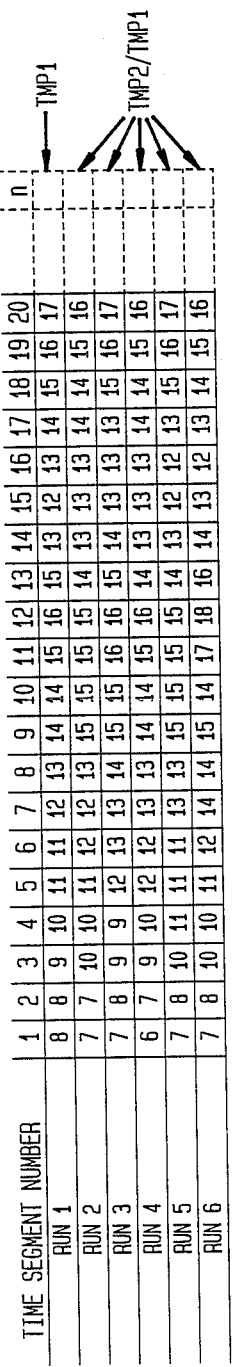

Referring to FIG. 6E, the digitized integral values for each of the time segments 1–250 corresponding to the return echos from a given transmission pulse are then temporarily stored in a storage array TMP1. Digitized integral values of each transmission pulse are referred to in FIG. 6E as values for corresponding "Runs", with the values of Run 1 corresponding to the values of the return echoes generated in response to the first transmitted pulse, the values of Run 2 corresponding to the values of the return echoes generated in response to the second transmitted pulse, the values of Run 3 corresponding to the values of the return echoes generated in response to the third transmitted pulse, the values of Run 4 corresponding to the values of the echoes generated in response to the fourth transmitted pulse, and so forth.

Figure 6F:
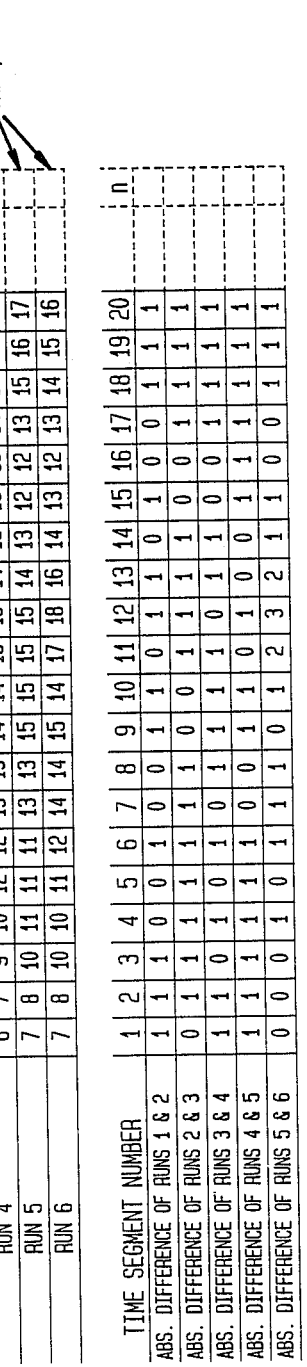

Assuming that the 250 digital values of Run 1 have been stored in temporary storage array TMP1, as shown in FIG. 6E, and that the 250 digital values of Run 2 are being placed into a temporary storage array TMP2, the operating program of the microprocessor 19 performs a mathematical operation on the various values being stored in the 250 time segments for each of Runs 1 and 2 to arrive at an absolute difference value between such digital values. Thus, referring to FIG. 6F, it will be seen that the absolute difference value between Runs 1 and 2 for time segment 1, is equal to 8 minus 7, or 1; the absolute difference value between Runs 1 and 2 for time segment 2 is also 1; the absolute difference value for time segment 3 is also 1 (in this case 9 minus 10); the absolute difference value for time segment 4 is 0 (10 minus 10); and so forth. The foregoing 2-Run or paired-Run process is repeated 4 more times, and 5 absolute integral-difference readings are obtained for the paired responses at each of the time segment locations, as also shown in FIG. 6F. The temporary storage array identification for each of the Runs (i.e., TMPI and TMP2) changes after each difference value is calculated so that Run 2, which had the designation TMP2 during the Run 1/Run 2 calculation, is redesignated as TMP1 for the Run 2/Run 3 calculation, and the Run 3 values become TMP2 for that calculation, and so forth.

Figure 6G:
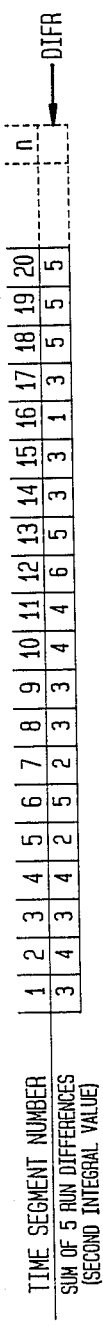

Referring to FIG. 6G, the 5 absolute integral-difference readings at each time segment location are summed and the 250 time segment values of the sums are stored in memory in an array DIFR. The summing of the 5 absolute integral-difference values DIFR at each time segment location represents an integration of such difference values; it is hereinafter also referred to either as a "second integral" or as "DIFR".

It will be apparent that, rather than using the absolute differences between Runs 1 and 2, 2 and 3, 3 and 4, 4 and 5, and 5 and 6 to get the five absolute integral-difference values at each time segment, the absolute integral-differences between the values obtained in Runs 1 and 2, Runs 3 and 4, Runs 5 and 6, Runs 7 and 8, and Runs 9 and 10 could be used instead. However this would entail the use of more storage space in the microprocessor and would take longer to accomplish than using the paired-Runs arrangement shown in FIG. 6F. It will also be apparent that more than two runs can be employed in the run-pairing process. For example, three or more runs can be compared with one another and either the maximum difference utilized, or the sum of the differences utilized as the absolute integral-difference at each time segment.

The 2-Run or paired-Run process, in which the absolute difference of the integrals at each time segment is obtained, is continued during a continuously updated 30 paired-Run procedure. In this procedure the 30, or other preselected number of, latest absolute integral-difference values at each time segment are summed, and the 250 values of these sums are stored in memory, as shown in FIG. 6H. Summing of the 30 absolute integral-difference values at each time segment represents yet another integration of the integral-difference values. This data is used in connection with sensing extremely slow intrusion movements in the protected area.

The 2-Run or paired-Run process is repeated over and over again as the intrusion detection apparatus runs. The highest and second highest second integral values (the values of the sums of five absolute integral-difference values) that occur during the latest one hundred calculations for the second integral at each time segment is stored in memory and these values are continuously updated. These values are used as the basis, or datum matrix, against which succeeding five paired-Run second integral values are tested to determine if an alarm is to be triggered.

Referring to FIG. 6I, a representation of the highest second integral values, identified as REF, and the second highest second integral values for each of the time segments 1–20 has been illustrated. The bottom line of FIG. 6I shows second integral values for the latest five paired-Runs (different from those of FIG. 6G) temporarily stored in memory. It is noted that the second integral values for adjacent pairs of time segments 11 and 12, 12 and 13, 13 and 14, and 14 and 15, of the latest five-paired Runs, represented diagramatically at A, B, C and D in FIG. 6I, exceed the highest second integral values of the previous one hundred 5 paired-Runs in the matrix. These adjacent pairs of higher values, referred to as "detections", are employed in connection with potentially triggering an intrusion alarm, depending upon the number of detections occurring as a result of a given five paired-Runs. Thus, when the second integral value (the sum of 5 absolute integral-difference values) for the five latest paired-Runs exceeds the highest stored second integral value REF for a predetermined number of adjacent pairs of time segments in the REF datum matrix, the alarm is triggered.

The predetermined number of adjacent pairs of time segments for which the stored second integral value REF has to be exceeded varies, depending on the location (from 1 to 250) of the time segment, and on the degree of sensitivity extant in the receiving circuits at the time. Considering the transducer as "time zero", an alarm trigger will be actuated with the system at maximum sensitivity if 10 or more adjacent pairs of second integral values REF are exceeded between about time segment 1 (2 feet from the transducer) and about time segment 250 (about 41 feet from the transducer); similarly, if 6 or more adjacent pairs of second integral values REF are exceeded between about time segment 80 (about 15 feet from the transducer) and about time segment 250, the alarm will trigger; also, if four or more adjacent pairs of second integral values REF are exceeded between about time segment 155 (about 26 feet from the transducer) and about time segment No. 250, the alarm will trigger; and, finally, if three or more adjacent pairs of second integral values REF are exceeded between about time segment 197 (about 33 feet from the transducer) and about time segment No. 250, the alarm will trigger.

Considering the detection algorithm generally, when the intrusion detection apparatus is started up, it provides exit delay. After this, it gathers about 100 measurements to establish a data base. The next procedure that occurs is that it provides access for the user to instruct it with zone exclusion data. It then starts to perform with reduced sensitivity. After about 100 more measurements the sensitivity increases, and after approximately 10 minutes it goes to maximum sensitivity. In connection with detection it studies the protected area by taking several measurements and computing a reference array, or datum matrix, REF. The array REF consists of 250 values, each one indicating the maximum sum for five integral-difference values received for that sample location or time segment during the last 100 groups of 5 paired-Runs. After studying the area, an intrusion can be detected by taking a measurement and comparing each point in the latest array DIFR (sum of 5 paired-Runs integral-differences) with the corresponding point in the array REF. If the value of DIFR for a given time segment is greater than the value of REF for that time segment, then the point of that time segment is a detection. If the number of detected points in the measurement exceeds a certain number (depending on the location of the points), then the alarm is triggered and the detector can calculate the distance of the intrusion according to the points detected. The array REF is updated if no alarm is set. The two highest second integral (DIFR) values during the last 100 sets of 5 paired runs are stored in memory for reference for each time segment. If during operation a higher DIFR value arrives, it replaces the previous highest value (REF) and the previous second highest value disappears from the memory. If no equal or higher DIFR value arrives after 100 sets of 5 paired runs, the second highest DIFR value becomes the new highest value (REF) and the previous highest value disappears from the memory.

The timing and control circuits of the detector differentiate between two different kinds of high level noise: first, stationary source noises such as those generated by telephones, doorbells and the like; and, second, other noises such as those that are done to interfere with the normal behavior of the detector, for example the shaking of keys. If high level noise appears during ongoing operation of the detector, the detector will go through about a 10-second waiting period prior to providing an alarm signal. If the noise continues during and after the 10-second period, the alarm will be triggered. Similarly, if the noise level is increasing with time, the detector will assume that noise is being generated in order to interfere with the normal operation of the detector and, therefore, it will also trigger the alarm. Finally, if the noise source has a repetitive cycle (for example as with the ringing of a bell), then the detector will perform a statiscal algorithm to reduce the sensitivity accordingly.

With regard to air turbulence treatment, when an air conditioner or heater is turned on, air turbulence appears. If this happens during operation of the detector, then the reference table (array REF) must be modified and updated because air turbulence produces a large difference in the measurements recorded in the detector. In general the change in value of the measurements at each of the time segment points will follow a known curve with respect to time. In order to avoid false alarms due to air turbulence the rate of change of values for the various points in the DIFR array are considered and if they do not increase beyond the anticipated curve values, no detection is made and no alarm is signaled. After a predetermined time has passed, the detector updates the array REF and resumes normal operation of comparing the arrays DIFR and REF to make detections.

As will appear in greater detail hereinafter, the detector undergoes a masking study when it starts operation. In doing this, it measures the echo response within the first listening area, in absolute values rather than in difference values. In each subsequent Run, the masking values obtained are checked with respect to safety boundaries based on the original values studied and if they do not fall within those boundaries, then a mask error is detected and an alarm signal given.

The detector also undergoes a blocking detection check. When the detector starts operation, it takes a measurement and computes the sum of all of the absolute values determined for all of the time segments. If, during normal operation, the sum of the absolute values of all of the time segments increases or decreases by more than 50%, a blocking attempt alarm signal will be issued.

Figure 4A:
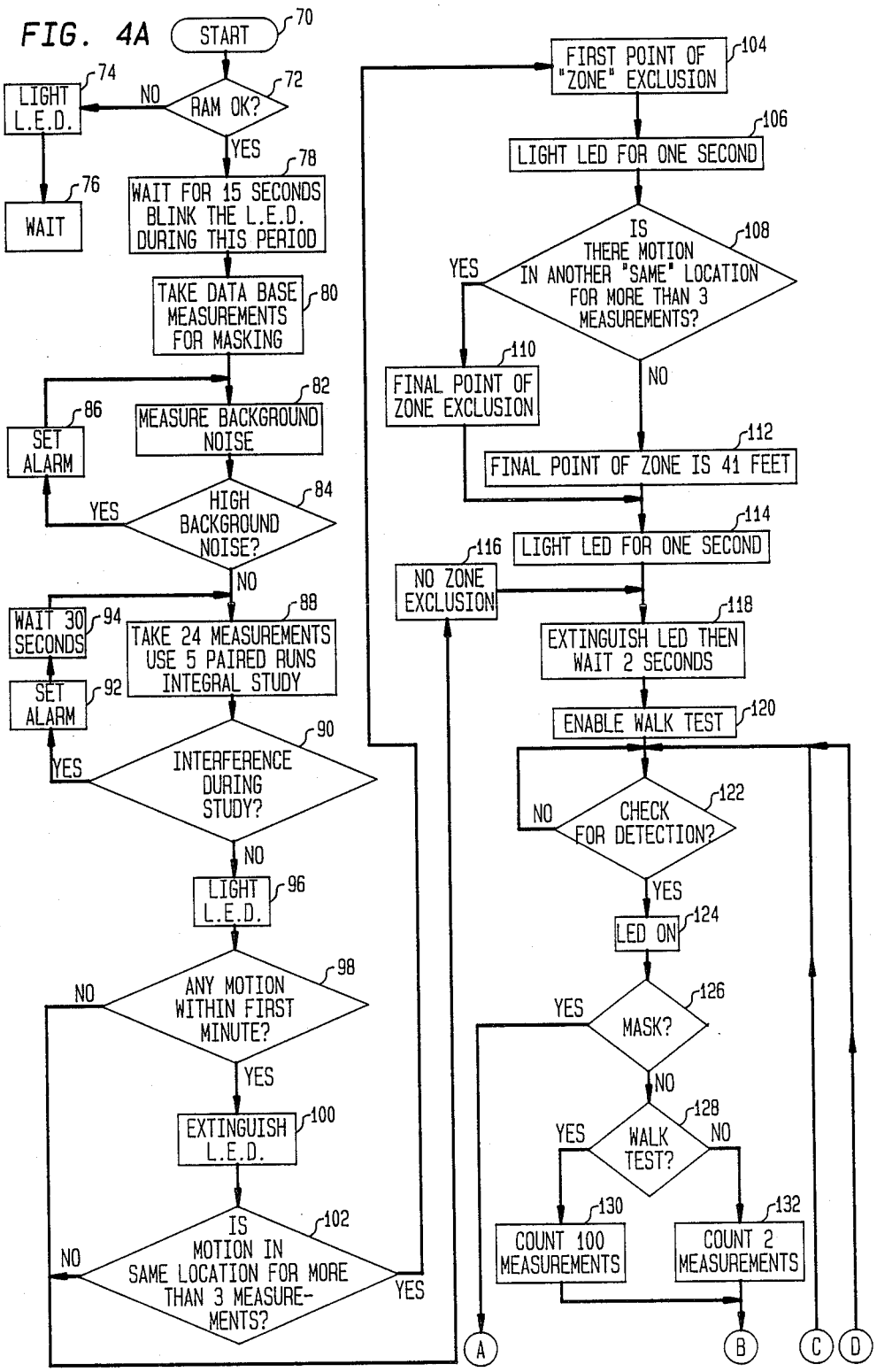
FIGS. 4A and 4B, together, constitute a flow chart illustrating the logic employed by the intrusion detection apparatus of the present invention during start-up and operation thereof.
Figure 4B:
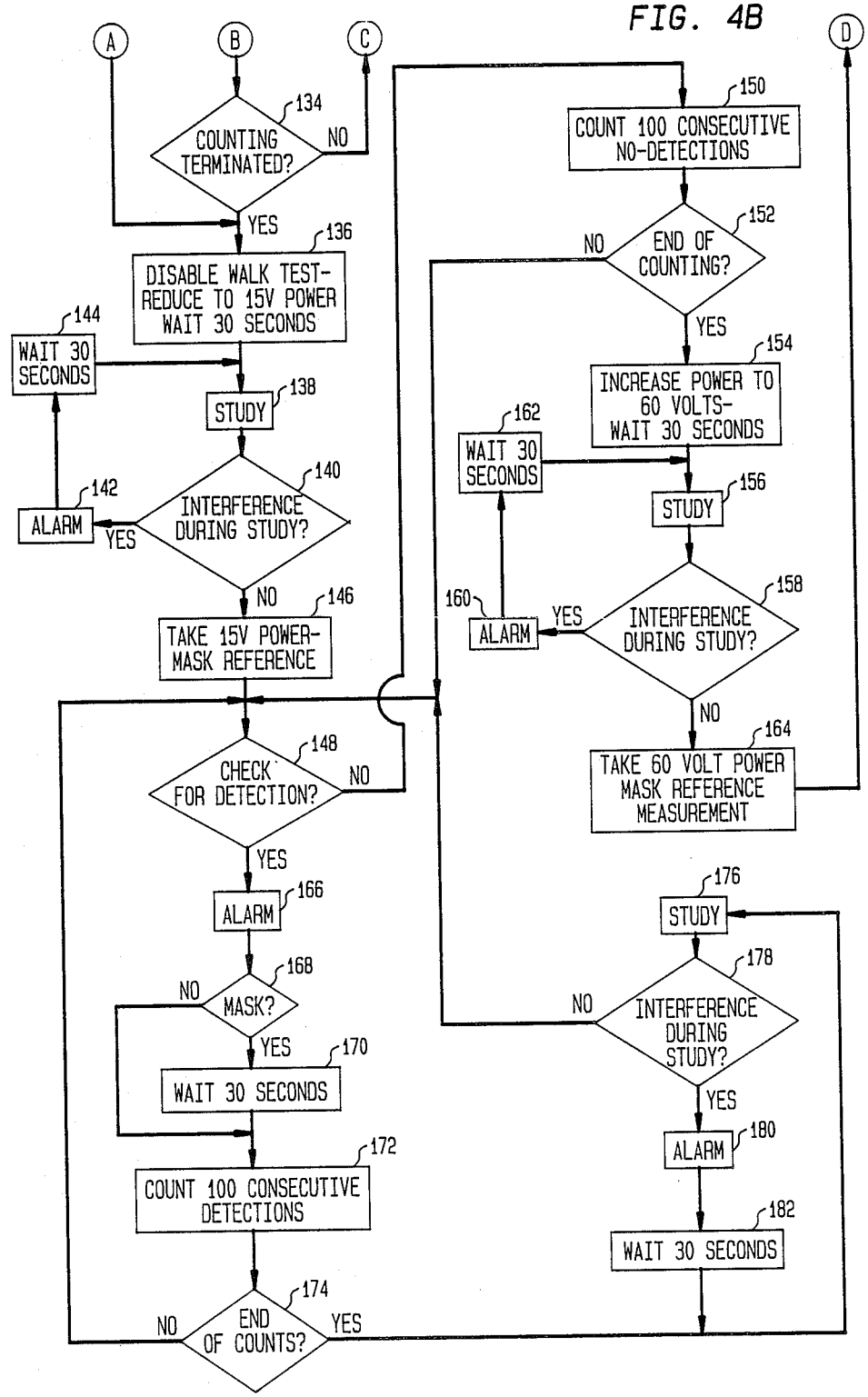

Referring now to FIG. 4A and 4B, a logic flow chart is shown therein which illustrates generally the steps taken by the intrusion detection apparatus, under the control of its operating program, in connection with the starting up and continuing operation of the detector. A detailed operating program for controlling the detector will be set forth in greater detail hereinafter.

As shown in FIG. 4A, when power is applied to the detector a start sequence is initiated, as indicated at 70, during which the random access memory of the microprocessor is checked, as indicated at 72, and a decision is made as to whether or not the RAM is in proper operating condition. If the RAM is not in proper operating condition, a LED light comes on, as indicated at 74, and the apparatus waits for corrective action to be taken, as shown in 76.

Assuming the RAM is in proper operating condition, a fifteen second waiting period occurs during which the LED blinks, as shown at 78, and then the program proceeds through an algorithm during which masking data base measurements are taken, at a 60 volt power level, for a mask reference table, as shown at 80. Then the background noise level is measured, as shown at 82, and a decision made as to whether or not the background noise level is high, as shown at 84. If the background noise level is high, an alarm is triggered, as shown at 86, and the program loops to keep rechecking the background noise level. If the background noise level is not high, an algorithm is initiated by the program during which measurements are taken of 24 groups of 5 paired-Runs each to determine the absolute integral differences of the various time segments of each paired Run, as indicated at 88.

The resulting data establishes a data base for use in connection with subsequent detections. In addition if noise interference is noted during the study, as shown at 90, an alarm sounds, as indicated at 92, and a waiting period of thirty seconds is initiated, as indicated at 94, before the detector algorithm loops to retake the measurements for a subsequent interference study. Assuming that no interference is determined during the interference study 90, the LED lights, as indicated at 96, and the program enters a new algorithm during which a check is made to determine whether or not a zone of the protected region is to be excluded from the checking program.

The zone exclusion procedure starts with a check or decision point, indicated at 98, to determine whether or not there is any motion in the protected region within one minute of the time that the LED light came on at 96. If there is motion within the protected region, for example the user waving his hands at the starting point of the zone to be excluded, this motion is detected and the LED is extinguished, as shown at 100. Assuming that the motion continues for more than three measurements at a "same" location, as determined at 102, the program accepts such motion as the starting point of the zone to be excluded, as shown at 104, and the LED lights for one second, as shown at 106. The system then checks for motion at another "same" location for more than three measurements, as shown at 108 and, if such motion is determined, the point of such motion becomes the final point of zone exclusion, as shown at 110. If no motion at a second "same" location occurs for more than three measurements, the final point of zone exclusion is set to occur at about forty-one feet from the transducer, as shown at 112, and the LED light comes on for one second, as shown at 114.

Returning to the decision point 98, if no motion is sensed within the first minute of the zone exclusion check, or if the motion that is detected does not occur at the same location for more than three measurements, as indicated at 102, the procedure discussed in connection with points 104–114 is bypassed and a "no zone exclusion" signal, indicated at 116, is generated which extinguishes the LED and initiates a two second delay before further action occurs under the program, as indicated at 118.

Figure 3D:
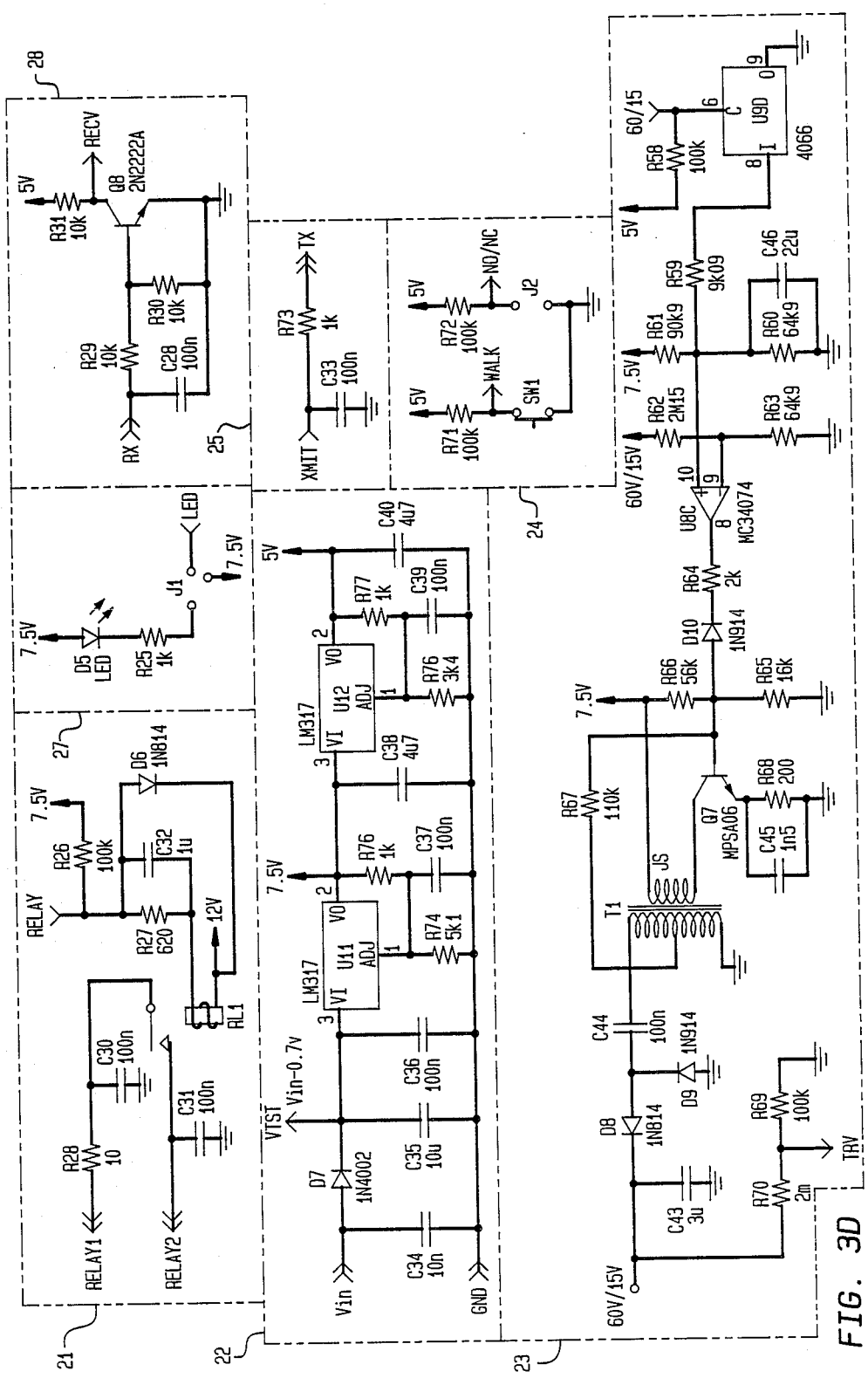

Following the two second delay, the program enables a "walk test", as shown at 120. The "walk test" is a period of time allotted in the program during which the operation of the alarm of the detector is inhibited so that the user may walk in the protected area without causing an alarm to sound but with the detection of his movement, as shown at 122, causing the LED to light, as shown at 124. This feature is provided to enable the user to check the detection coverage of the detector in the protected region. The walk test may be manually initiated at any time by depression of on/off switch SW1 of the mode control unit 24 (FIG. 3D). Switch SW1, when in the "on" position, provides for disablement of the alarm circuits in order to allow the walk test to be performed.

Assuming that the walk test has been enabled at 120, the program calls for the detector system to check for detections. If no detections occur, the decision point loops, as indicated at 122, until detections start to occur. When detections occur, the LED light comes on, as indicated at 124, and assuming no masking interference is present so that a "no" decision is reached at decision point 126, the walk test decision point at 128 provides a "yes" output and 100 measurements are then counted out, as indicated at 132.

In the absence of a walk test enablement at 120 (e.g., when decision point 122 is arrived at from a different approach) a two-second time delay is counted out, as indicated at 132. In either case a decision is reached at the decision point indicated at 134 (FIG. 4B) when the appropriate time period has been counted out and the counting has terminated. The circled reference letters "A", "B", "C" and "D", appearing at the bottom of FIG. 4A and at the top of FIG. 4B, indicate that the flow arrows connected thereto are interconnected to one another at those points in the two figures.

When the time period has been counted out, the walk test is disabled and the power level of the transmitter is reduced from a 60 v level to a 15 v power level, as indicated at 136. At this point a 30-second time delay is also initiated to facilitate the changeover of the power levels and to provide exit delay for the user to exit the protected region.

After the 30-second time delay has expired, a study is initiated, as indicated at 138, in which new data bases for masking and detections are created, similar to those created at 80 and 88, respectively, and a decision is made at 140 as to whether or not any noise interference occured during the study period. If noise interference occurred, an alarm sounds, as indicated at 142, and another 30-second waiting period is initiated, as indicated at 144, before the study is resumed.

Assuming no noise interference occurred during the study, the program calls for a mask reference table to be established at the 15 v power level, as indicated at 146, and a check for detections to be made as indicated at 148. If no detections occur, the system then counts 100 consecutive no-detection readings, as indicated at 150 and as determined by the decision point 152. At the end of the 100 no-detection readings, the programs instructs the system to increase power to the 60v level and wait 30 seconds for the power change-over to take effect, as indicated at 154. Thereafter, the program instructs the system to initiate new studies, similar to those initiated at 80 and 82, at the increased power level, as indicated at 156, and to decide whether or not there is noise interference during the studies, as indicated at 158. If noise interference is encountered during the 60 v power level studies, an alarm is sounded, as indicated at 160, and a 30-second waiting period is undertaken before the studies are reinitiated, as indicated at 162.

Assuming no noise interference is encountered during the studies, a decision is made at decision point 158 to take a plurality of 60 v power mask reference measurements for a mask reference table, as indicated at 164. When the 60v power mask reference table is completed, the system loops back to the decision point 122 (FIG. 4A) and through the various points of the loop 122–148.

Returning to a consideration of the decision point 148 during start-up of the detector, if detections occur at 148 the alarm sounds as indicated at 166, a masking decision is made at 168 and, assuming no masking is present or, if present, after a 30 second wait, indicated at 170, the program directs the detector to count 100 consecutive detections, as indicated at 172. When 100 detections have been counted, the decision point 174 indicates that fact and studies are then made, similar to those done at 80 and 88, and a check made at 176 to determine whether or not noise interference has occurred during the studies, as indicated at 178. If noise interference has occurred, as indicated at decision point 178, an alarm sounds, as indicated at 180, and a 30-second waiting period, indicated at 182, is undertaken before the study recommences at 176. Assuming no noise interference is encountered during the re-study to trigger the alarm, as indicated by a "no" signal being generated at the decision point 178, the program loops back to the decision point 148 and through the points 150–164 to loop back to the detection checking decision point 122 of FIG. 4A.

The cycle indicated by the points 122–182 is repeated two more times during the initial start-up period and with each repetition the sensitivity of the receiving circuits is increased so that, after the third cycle, full sensitivity of the receiving circuits is in effect. This full start-up period takes about ten minutes and, upon its completion, the detection cycle repeats itself at full sensitivity.

Referring now to FIGS. 7A-7C, a multiple transducer triangulation system for locating the position of an intruder in the protected region is disclosed. FIG. 7A shows only transducer 200 of the two tranducers 200 and 202 detecting an intruder 204. Although the distance to the intruder can be calculated, based on a determination of which time segments are generating the detection signal alarm, the coordinates of the intruder cannot be determined. FIG. 7B illustrates detection of the intruder 204 by both of the transducers 200 and 202. In this case, referring to FIG. 7C, the azimuthal coordinates of the intruder can be calculated by triangulation from the signal information received by transducers 200 and 202. The technique described in FIGS. 7A-7C may be extended further by use of a third transducer (not shown) disposed outside of the plane of transducers 200 and 202, for allowing calculation of the elevational coordinates of the intruder, thus locating the intruder in 3-dimensional space.

The number of adjacent pairs of higher second integrals or DIFR values required to trigger an alarm is preferably adjustable and has been selected in the case of the present invention to vary with the length of time that the detector has been in operation after being started. Thus, during the first 100 runs of the detector, when the detector is running with reduced sensitivity, the alarm will be actuated if 20 or more adjacent pairs of second integral values REF are exceeded between time segment No. 1 and time segment No. 250; similarly, if 12 or more adjacent pairs of second integral value REF are exceeded between time segment No. 8 and time segment No. 250, the alarm will trigger; also, if 8 or more adjacent pairs of second integral values REF are exceeded between time segment No. 155 and time segment No. 250, the alarm will trigger; and, finally, if 6 or more adjacent pairs of second integral values REF are exceeded between time segment No. 197 and time segment No. 250, the alarm will trigger.

During the next 100 additional 5-paired runs, when the sensitivity has been increased to an intermediate level, the alarm trigger will be actuated if 12 or more adjacent pairs of second integral values REF are exceeded between time segment No. 1 and time segment No. 250. Similarly, if 8 or more adjacent pairs of second integral values REF are exceeded between time segment No. 80 and time segment No. 250, the alarm will trigger; also, if 6 or more adjacent pairs of second integral values REF are exceeded between time segment No. 155 and time segment No. 250, the alarm will trigger; and, finally, if 5 or more adjacent pairs of second integral values REF are exceeded between time segment No. 197 and time segment No. 250, the alarm will trigger.

A print-out of a suitable software program that may be used to control the operation of the timing and control circuits 1 of the detector has been set forth in TABLE I which follows. The software program of TABLE I is based on Intel's "PLM51" high level language and Intel's "ASM51" machine language. The program generally appears on the left side of TABLE and descriptive comments with respect to various of the algorithms appear primarily on the right side of TABLE I. The comments appear in the form "/*. . .*/" to distinguish them from lines of the program.

After approximately 10 minutes of operating time, when at least 200 5-paired runs have been completed and the system is operating with maximum sensitivity, the alarm trigger will be actuated if 10 or more adjacent pairs of second integral values REF are exceeded between time segment No. 1 and time segment No. 250; similarly, if 6 or more adjacent pairs of second values REF are exceeded between time segment No. 80 and time segment No. 250, the alarm will trigger; also, if 4 or more modifications as fall within the true spirit and scope of the invention.

TABLE I — SOFTWARE PROGRAM BASED ON "PLM51" HIGH LEVEL LANGUAGE AND "ASM51" MACHINE LANGUAGE

```
$ DEBUG
$ ROM(LARGE)
OPERATE:  DO;
DECLARE  (TMP1,TMP2,INTGRL,RAASH1,RAASH2,RAASH,
          REF_MAX11,REF_MAX21,REF_MAX14,REF_MAX24,
          DETECTIONS,TAN1,TAN2,EMPTY) (250) BYTE AUXILIARY ;
DECLARE  (INTGRL32,REF_MAX132,REF_MAX232) (250) WORD AUXILIARY
DECLARE  (NOISE,SIGNAL) (200) BYTE AUXILIARY ;
DECLARE  (MASKLOW,MASKHIGH) (8) BYTE AUXILIARY ;
DECLARE  (ZONE,TH) (4) BYTE AUXILIARY ;
DECLARE  (EXNOISE,CNOISE,TNOISE,N1,N2,NODET,
          MASKCNT1,MASKCNT2,CNTN,CNTDET,CNTTAN,
          NLEVEL,PERIOD,ENDTAN,LOWZONE,HIGHZONE,
          DETHIGH,DETLOW,OKLOW,DISTANCE,CNTEMPTY,WALK) BYTE
          AUXILIARY ;
DECLARE  (REFCOUNT1,REFCOUNT4,REFCOUNT32,
          THRESHOLD,CNTTH,REF_NOISE) WORD AUXILIARY ;
DECLARE  (II,JJ,FF,KK,TMP,SUM,NOISE2,OK,ALARM,DETTYPE) BYTE;
DECLARE  (MM,NN) WORD;
```

```
DECLARE COUNT1      LITERALLY '100' ;
DECLARE COUNT4      LITERALLY '25'  ;
DECLARE COUNT32     LITERALLY '3'   ;
DECLARE SECONDS     LITERALLY '15'  ;   /* 15 SECONDS DELAY */
DECLARE REG         LITERALLY 'REGISTER';

/********* BYTE REGISTERS ********/
DECLARE
    P0   BYTE   AT(80H)   REG,
    P1   BYTE   AT(90H)   REG,
    P2   BYTE   AT(0A0H)  REG,
    P3   BYTE   AT(0B0H)  REG,
    PSW  BYTE   AT(0D0H)  REG,
    ACC  BYTE   AT(0E0H)  REG,
    B    BYTE   AT(0F0H)  REG,
    SP   BYTE   AT(81H)   REG,
    DPL  BYTE   AT(82H)   REG,
    DPH  BYTE   AT(83H)   REG,
    PCON BYTE   AT(87H)   REG,
    TCON BYTE   AT(88H)   REG,
    TMOD BYTE   AT(89H)   REG,
    TL0  BYTE   AT(8AH)   REG,
    TL1  BYTE   AT(8BH)   REG,
    TH0  BYTE   AT(8CH)   REG,
    TH1  BYTE   AT(3DH)   REG,
    IE   BYTE   AT(0A8H)  REG,
    IP   BYTE   AT(0B8H)  REG,
    SCON BYTE   AT(98H)   PEG,
    SBUF BYTE   AT(99H)   REG;

/********* BIT REGISTERS ********/

/********* PSW BITS ********/
DECLARE
    CY   BIT   AT(0D7H)  REG,
    AC   BIT   AT(0D6H)  REG,
    F0   BIT   AT(0D5H)  REG,
    RS1  BIT   AT(0D4H)  REG,
    RS0  BIT   AT(0D3H)  REG,
    OV   BIT   AT(0D2H)  REG,
    P    BIT   AT(0D0H)  REG,

/********* TCON BITS ********/
    TF1  BIT   AT(8FH)   REG,
    TR1  BIT   AT(8EH)   REG,
    TF0  BIT   AT(8DH)   REG,
    TR0  BIT   AT(8CH)   REG,
    IE1  BIT   AT(8BH)   REG,
    IT1  BIT   AT(8AH)   REG,
    IE0  BIT   AT(89H)   REG,
    IT0  BIT   AT(88H)   REG,

/*********   IE  BITS ********/
    EA   BIT   AT(0AFH)  REG,
    ES   BIT   AT(0ACH)  REG,
    ET1  BIT   AT(0ABH)  REG,
    EX1  BIT   AT(0AAH)  REG,
    ET0  BIT   AT(0A9H)  REG,
    EX0  BIT   AT(0A8H)  REG,
```

```
/********* IP BITS ********/
  PS    BIT  AT(0BCH)  REG,
  PT1   BIT  AT(0BBH)  REG,
  PX1   BIT  AT(0BAH)  REG,
  PT0   BIT  AT(0B9H)  REG,
  PX0   BIT  AT(0B8H)  REG,

/********* P1 BITS ********/
  D1    BIT  AT(90H)   REG,
  D2    BIT  AT(91H)   REG,
  U160  BIT  AT(92H)   REG,
  L25   BIT  AT(93H)   REG,
  H25   BIT  AT(94H)   REG,
  LRN   BIT  AT(95H)   REG,
  RELY  BIT  AT(96H)   REG,
  RCIND BIT  AT(97H)   REG,

/********* P3 BITS ********/
  RD    BIT  AT(0B7H)  REG,
  WR    BIT  AT(0B6H)  REG,
  RSTT  BIT  AT(0B5H)  REG,
  RSW   BIT  AT(0B4H)  REG,
  LED   BIT  AT(0B3H)  REG,
  V60_15 BIT AT(0B2H)  REG,
  TXD   BIT  AT(0B1H)  REG,
  RXD   BIT  AT(0B0H)  REG,

/********* SCON BITS ********/
  SM0   BIT  AT(9FH)   REG,
  SM1   BIT  AT(9EH)   REG,
  SM2   BIT  AT(9DH)   REG,
  REN   BIT  AT(9CH)   REG,
  TB8   BIT  AT(9BH)   REG.
  RB8   BIT  AT(9AH)   REG,
  TI    BIT  AT(99H)   REG,
  RI    BIT  AT(98H)   REG;

RCV: PROCEDURE(xx) EXTERNAL ;
     declare (xx) word ;
END RCV ;

XMT: PROCEDURE EXTERNAL ;
END XMT ;

TIM: PROCEDURE(XX) ;              /* TIME DELAY PROCEDURE */
   DECLARE (XX,YY) WORD ;         /* THE DELAY IS         */
     DO YY=1 TO XX ;              /* 23usec * XX          */
     END ;                        /*                      */
END TIM ;

SIREN: PROCEDURE ;
     LED=1 ;                      /* SIREN PRODUCING PROGRAM */
     RELY=1 ;
     CALL TIM(20000) ;
     LED=0 ;
     RELY=0 ;
END SIREN ;
```

```
ABSS: PROCEDURE(AA,BB) BYTE ;
   DECLARE (AA,BB) BYTE ;
      IF AA¢BB THEN RETURN AA-BB ;
             ELSE RETURN BB-AA ;
END ABSS ;

COUNT_NOISE: PROCEDURE ;
      CNOISE=CNOISE+1 ;   /* MEASURES FOR HIGH LEVEL NOISE */
      IF TNOISE=0 THEN TNOISE=1 ;
      EXNOISE=1;
      OK=0 ;
END COUNT_NOISE ;

CHECKMASK: PROCEDURE ;
   DECLARE (II,KK,TMP) BYTE ;     /*  CHECKS FOR MASK ATTEMPTS */
      MASKCNT2=MASKCNT2+1 ;
      IF MASKCNT2¢250 THEN DO ;
         MASKCNT1=0 ;
         MASKCNT2=0 ;
      END;
      KK=0 ;
      DO II=2 TO 7 ;
         IF V60_15=0 THEN TMP=ABSS(TMP1(II),MASKHIGH(II)) ;
                    ELSE TMP=ABSS(TMP1(II),MASKLOW(II)) ;
         IF TMP¢9 THEN KK=KK+1 ;
      END ;
      IF KK¢2 THEN MASKCNT1=MASKCNT1+1 ;
      IF MASKCNT1¢9 THEN DO ;
         ALARM=1 ;
         MASKCNT1=1 ;
      END ;
END CHECKMASK ;

CHECK: PROCEDURE ;
   DECLARE (KK,II) BYTE ;    /*  CHECK FOR DETECTIONS  */
      DO II=3 TO 247 ;
         IF DETECTIONS(II)¢0 THEN DO ;
            IF ((DETECTIONS(II-2)=0) AND (DETECTIONS(II-1)=0)
                AND (DETECTIONS(II+2)=0) AND
                (DETECTIONS(II+1)=0))
               THEN DETECTIONS(II)=0 ;
            END ;
         END ;
      DISTANCE=250 ;
      II=3 ;
      DO WHILE((DISTANCE=250) AND (II_248)) ;
         IF DETECTIONS(II)¢0 THEN DISTANCE=II ;
         II=II+1 ;
      END ;
      KK=0 ;
      OK=1 ;
      IF ((DISTANCE¢LOWZONE) AND (DISTANCE_HIGHZONE)) THEN DO ;
         DO II=DISTANCE TO HIGHZONE ;
            DETECTIONS(II)=0 ;
         END ;
         RETURN ;
      END ;
```

```
        DO WHILE(KK_4) ;
            SUM=0 ;
            DO II=ZONE(KK) TO 247 :
                SUM=SUM+DETECTIONS(II) ;
            END ;
            IF SUM¢TH(KK) THEN DO ;
                OK=0 ;
                RETURN ;
            END ;
            KK=KK+1 ;
        END ;
END CHECK ;

CHECK_EMPTY: PROCEDURE :
        DECLARE (KK,II) BYTE ;      /* CHECKS FOR NEW EVENTS IN */
            DO II=3 TO 247 ;        /*    OPEN SPACES          */
                IF DETECTIONS(II)=2 THEN DO ;
                    IF ((DETECTIONS(II-1)=0) AND (DETECTIONS(II+1)=0))
                        THEN DETECTIONS(II)=0 ;
                END ;
            END ;
            DISTANCE=250 ;
            II=3 ;
            DO WHILE((DISTANCE=250) AND (II_248)) ;
                IF DETECTIONS(II)=2 THEN DISTANCE=II ;
                II=II+1 ;
            END ;
            KK=0 ;
            OK=1 ;
            IF ((DISTANCE¢LOWZONE) AND (DISTANCE_HIGHZONE)) THEN
            RETURN ;
            DO_WHILE(KK_4) ;
                SUM=0 ;
                DO II=ZONE(KK) TO 247 ;
                    IF DETECTIONS(II)=2 THEN SUM=SUM+1 ;
                END ;
                IF SUM¢TH(KK) THEN DO ;
                    OK=0 ;
                    RETURN ;
                END ;
                KK=KK+1 ;
            END ;
    END CHECK_EMPTY ;

RENEW1: PROCEDURE ;
    DECLARE (II,TMP) BYTE ;
        REFCOUNT1=REFCOUNT1+1 ;
        IF REFCOUNT1¢1200 THEN DO ;
            REFCOUNT1=0 ;
            DO II=3 TO 249 ;
                REF_MAX11(II)=REF_MAX21(II) ;
                REF_MAX21(II)=0 ;
            END ;
        END ;
        DO II=3 TO 249 ;
            IF DETECTIONS(II)=0 THEN DO ;
                TMP=1+ABSS(TMP1(II),TMP2(II)) ;
                IF TMP¢REF_MAX11(II) THEN REF_MAX11(II)=TMP ;
                IF ((TMP¢REF_MAX21(II)) AND (REFCOUNT1¢COUNT1))
                    THEN REF_MAX21(II)=TMP ;
            END ;
```

```
      END ;
END RENEW1 ;

RENEW4: PROCEDURE ;
   DECLARE (II,TMP) BYTE ;
     IF CNTTH_300 THEN CNTTH=CNTTH+1 ;
     REFCOUNT4=REFCOUNT4+1 ;
     IF REFCOUNT4¢300 THEN DO ;
         REFCOUNT4=0 ;
         DO II=3 TO 249 ;
            REF_MAX14(II)=REF_MAX24(II) ;
            REF_MAX24(II)=0 ;

END ;
     END ;
     DO II=3 TO 249 ;
         IF DETECTIONS(II)=0 THEN DO ;
            TMP=2+INTGRL(II) ;
            IF TMP¢REF_MAX14(II) THEN REF_MAX14(II)=TMP ;
            IF ((TMP¢REF_MAX24(II)) AND (REFCOUNT4¢COUNT4))
                THEN REF_MAX24(II)=TMP ;
         END ;
     END ;
     REF_NOISE=0 ;        /*  CHECKS FOR NOISE LEVEL AND  */
     DO II=3 TO 249 ;     /*  USES RESULTS TO SET SENSITIVITY  */
         TAN2(II)=REF_MAX14(II) ;   /* IN MAIN PROGRAM */
         REF_NOISE=REF_NOISE+REF_MAX14(II) ;
     END ;
     REF_NOISE=SHR(REF_NOISE,1) ;
END RENEW4 ;

RENEW32: PROCEDURE ;
   DECLARE II BYTE ;
   DECLARE TMP WORD ;
     REFCOUNT32=REFCOUNT32+1 ;
     IF REFCOUNT32¢40 THEN DO ;
         REFCOUNT32=0 ;
         DO II=3 TO 249 ;
            REF_MAX132(II)=REF_MAX232(II) ;
            REF_MAX232(II)=0 ;
         END ;
     END ;
     DO II=3 TO 249 ;
/*       IF DETECTIONS(II)=0 THEN DO ;*/
            TMP=20+INTGRL32(II) ;
            IF TMP¢REF_MAX132(II) THEN REF_MAX132(II)=TMP ;
            IF ((TMP¢REF_MAX232(II)) AND (REFCOUNT32¢COUNT32))
                THEN REF_MAX232(II)=TMP ;
/*       END ;*/
     END ;
END RENEW32 ;

STUDY : PROCEDURE ;
DO II=0 TO 249 ;
   DETECTIONS(II)=0 ;
   REF_MAX14(II)=0 ;
   REF_MAX24(II)=0 ;
   REF_MAX11(II)=0 ;
   REF_MAX21(II)=0 ;
```

```
      REF_MAX132(II)=0 ;
      REF_MAX232(II)=0 ;
      EMPTY(II)=0 ;
      TAN1(II)=0 ;
END ;
EMPTY(0)=1 ;EMPTY(1)=1 ;EMPTY(2)=1 ;

TH(0)=40   ;TH(1)=24    ;TH(2)=16    ;TH(3)=12   ;
CNTTH=0 ;
REFCOUNT1=0 ;
REFCOUNT4=0 ;
REFCOUNT32=0 ;
NOISE2=0 ;
CNOISE=0 ;
TNOISE=0 ;
CNTN=0 ;
CNTTAN=0 ;
PERIOD=0 ;
NODET=0 ;
ENDTAN=250 ;
THRESHOLD=24 ;
JJ=0 ;

DO JJ=1 TO COUNT32 ;              /*  LONG TERM INTEGRAL  */
   DO II=3 TO 249 ;
       INTGRL32(II)=0 ;
   END ;
   DO FF=1 TO 8 ;
     DO II=3 TO 249 ;
        INTGRL(II)=0 ;
     END ;
     KK=1 ;
     DO WHILE(KK_5) ;
        CALL RCV(.RAASH1) ;
        CALL XMT ;
        CALL RCV(.TMP1) ;
        CALL TIM(1250) ;      /* DELAY OF 95 msec BETWEEN THE */
        CALL XMT ;            /* TWO PULSES */
        CALL RCV(.TMP2) ;
        ALARM=0 ;
        CALL CHECKMASK ;
        IF ALARM=1 THEN RETURN ;
        OK=1 ;
        DO II=100 TO 200 ;
           TMP=ABSS(RAASH1(II),NLEVEL) ;
           IF TMP¢2 THEN  OK=0 ;
        END ;
        IF OK=1 THEN DO ;
           KK=KK+1 ;
           CALL RENEW1 ;
           DO II=3 TO 249 ;
              TMP=ABSS(TMP1(II),TMP2(II)) ;
              SUM=INTGRL(II) ;
              IF SUM+TMP_SUM THEN INTGRL(II)=250 ;
                       ELSE INTGRL(II)=SUM+TMP ;
              IF EMPTY(II)=0 THEN DO ;
                 IF ((TMP1(II)¢NLEVEL) OR (TMP2(II)¢NLEVEL)) THEN
                 EMPTY(II)=1 ;
              END ;
```

```
            END ;
          END ;
          ELSE DO ;
             NOISE2=NOISE2+1 ;
             CALL TIM(3000) ;
          END ;
          IF NOISE2¢100 THEN DO ;
             ALARM=1 ;
             RETURN ;
             NOISE2=0 ;
          END ;
      END ;
      CALL RENEW4 ;
      DO II=3 TO 249 ;
         INTGRL32(II)=INTGRL32(II)+INTGRL(II) ;
      END ;
   END ;
   CALL RENEW32 ;                    /*  ESTABLISHES DATA BASE   */
   END ;                             /*DURING STUDY MODE INTERVAL */
   II=0 ;
   DO WHILE(II_241) ;
      OK=1 ;
      DO KK=II TO II+9 ;
         IF EMPTY(KK)¢0 THEN OK=0 ;
      END ;
      IF OK=0 THEN DO ;
         DO KK=II TO II+9 ;
            EMPTY(KK)=1 ;
         END ;
      END ;
      II=II+10 ;
   END ;
   END STUDY ;

DETECTT : PROCEDURE ;
   IF CNTTH=100 THEN DO ; /* SETS LOW SENSITIVITY DURING FIRST */
      CNTTH=CNTTH+1 ;     /* 100 RUNS */
      THRESHOLD=12 ;
      TH(0)=20 ; TH(1)=12 ; TH(2)=8  ; TH(3)=6 ;
   END ;
   IF CNTTH=200 THEN DO ; /* SETS MED. SENSITIVITY DURING   */
      CNTTH=CNTTH+1 ;     /* SECOND 100 RUNS*/
      THRESHOLD=10 ;
      TH(0)=12 ; TH(1)=8  ; TH(2)=6  : TH(3)=5 ;
   END ;
   IF ((REF_NOISE_3500) AND (CNTTH¢200) AND (CNTTAN=0)) THEN DO ;
      THRESHOLD=6 ;       /* SETS HIGH SENSITIVITY AFTER 200 RUNS */
      TH(0)=10 ; TH(1)=6 ; TH(2)=4 ; TH(3)=3 ;
   END ;
   TMP=CNTTAN ;
   IF ((TMP=1) OR (TMP=3) OR (TMP=4) OR (TMP=5) OR (TMP=10)) THEN
   DO ;
      DO II=3 TO 249 ;
         IF TAN1(II)¢REF_MAX14(II)
            THEN TAN2(II)=TAN1(II) ;
            ELSE TAN2(II)=REF_MAX14(II) ;
      END ;
   END ;
```

```
IF  ((TMP=20) OR (TMP=40) OR (TMP=60) OR (TMP=ENDTAN))    THEN
DO ;
    DO II=3 TO 249 ;
        INTGRL(II)=TAN1(II) ;
        DETECTIONS(II)=0 ;
        TAN1(II)=0 ;
    END ;
    CALL RENEW4 ;
    CALL RENEW1 ;
END ;
IF CNTTAN¢0 THEN CNTTAN=CNTTAN+1 ;
IF CNTTAN¢ENDTAN THEN DO ;
    CNTTAN=0 ;
    PERIOD=1 ;
    ENDTAN=250 ;
    THRESHOLD=6 ;
    TH(0)=10 ; TH(1)=6  ; TH(2)=4   ; TH(3)=3 ;
END ;
IF PERIOD¢0 THEN PERIOD=PERIOD+1 ;
IF PERIOD¢50 THEN PERIOD=0 ;

IF JJ=0 THEN DO ;
    DO II=0 TO 249 ;
        INTGRL32(II)=0 ;
    END ;
END ;
DO II=3 TO 249 ;
    INTGRL(II)=0 ;
    RAASH(II)=0 ;
END ;
MM=.RAASH1 ;
N1=0 ;
CNTDET=0 ;
CNTEMPTY=0 ;
DO KK=1 TO 4 ;
    CALL RCV(MM) ;  /* MEASURING THE BACKGROUND NOISE    */
    CALL XMT ;
    CALL RCV(.TMP1) ;
    CALL TIM(1250) ;     /* DELAY OF 95 msec BETWEEN THE TWO */
    CALL XMT ;           /* PULSES */
    CALL RCV(.TMP2) ;
    ALARM=0 ;
    CALL CHECKMASK ;
    IF ALARM=1 THEN RETURN ;
    IF MM=.RAASH1 THEN MM=.RAASH2 ;
              ELSE MM=.RAASH1 ;
    DO II=3 TO 249 ;
        TMP=ABSS(TMP1(II),TMP2(II)) ;
        IF TMP¢REF_MAX11(II) THEN DETECTIONS(II)=1 ;
                        ELSE DETECTIONS(II)=0 ;
        IF EMPTY(II)=0 THEN DO ;
            IF ((TMP1(II)¢NLEVEL) OR (TMP2(II)¢NLEVEL)) THEN
            DETECTIONS(II)=2 ;
        END ;
        SUM=INTGRL(II) ;
        IF SUM+TMP_SUM THEN INTGRL(II)=250 ;
                    ELSE INTGRL(II)=SUM+TMP ;
```

```
        IF KK¢1 THEN DO ;
            IF RAASH1(II)¢N1 THEN N1=RAASH1(II) ;
            IF RAASH2(II)¢N1 THEN N1=RAASH2(II) ;
            TMP=ABSS(RAASH1(II),RAASH2(II)) ;
            SUM=RAASH(II) ;
            IF SUM+TMP_SUM THEN RAASH(II)=250 ;
                        ELSE RAASH(II)=SUM+TMP ;
        END ;
    END ;
    IF KK=1 THEN CALL TIM(1300) ;
    CALL CHECK ;
    IF OK=0 THEN DO ;
        CNTDET=CNTDET+1 ;
        CALL TIM(1300) ;
    END ;
    ELSE CALL RENEW1 ;
    CALL CHECK_EMPTY ;
    IF OK=0 THEN CNTEMPTY=CNTEMPTY+1 ;
END ;
CALL RCV(MM) ;
DO II=3 TO 249 ;
    IF RAASH1(II)¢N1 THEN N1=RAASH1(II) ;
    IF RAASH2(II)¢N1 THEN N1=RAASH2(II) ;
    TMP=ABSS(RAASH1(II),RAASH2(II)) ;
    SUM=RAASH(II) ;
    IF SUM+TMP_SUM THEN RAASH(II)=250 ;
                ELSE RAASH(II)=SUM+TMP ;
END ;

IF TNOISE¢0 THEN TNOISE=TNOISE+1 ;
IF CNOISE¢5 THEN DO ;
    OK=0 ;
    ALARM=1 ;
    DETTYPE=1 ;
    TNOISE=0 ;
    CNOISE=2 ;
    RETURN ;
END ;
ELSE DO ;
    OK=1 ;
    ALARM=0 ;
    DETTYPE=0 ;
END ;
IF TNOISE¢10 THEN DO ;
    TNOISE=0 ;
    CNOISE=0 ;
END ;

DO II=0 TO 199 ;
    NOISE(II)=0 ;
END ;

DO II=7 TO 249 ;
    TMP=RAASH(II) ;
    IF TMP¢199 THEN TMP=199 ;
    NOISE(TMP)=NOISE(TMP)+1 ;
END ;
```

```
NOISE2=0 ;
EXNOISE=0 ;
/* EXECESSIVE NOISE DETECTION - CHECKS FOR HIGH LEVEL */
/* NOISE AND, IF MORE THAN 10 SECONDS DURATION, SETS */
/* AN ALARM */
DO II=150 TO 199 ;
   NOISE2=NOISE2+NOISE(II) ;
END ;
IF NOISE2¢30 THEN CALL COUNT_NOISE ;
ELSE DO ;
   KK=0 ;
   DO II=10 TO 249 ;
      IF RAASH1(II)¢100 THEN KK=KK+1 ;
   END ;
   IF KK¢10 THEN CALL COUNT_NOISE ;
END ;

IF EXNOISE=0 THEN DO ;
   NOISE2=0 ;
   DO II=5 TO 199 ;
      NOISE2=NOISE2+NOISE(II) ;
   END ;
      IF NOISE2¢1 THEN EXNOISE=2 ;
   END ;

IF EXNOISE¢0 THEN DO ;
      IF N1¢N2+5 THEN DO ;
         CNTN=CNTN+1 ;
         N2=N1 ;
      END ;
      IF CNTN¢2 THEN DO ;
         EXNOISE=3 ;
         ALARM=1 ;
         DETTYPE=2 ;
         OK=0 ;
         CNTN=1 ;
         RETURN ;
      END ;
   END ;
   ELSE DO ;
      CNTN=0 ;
      N2=0 ;
   END ;

/* NORMAL NOISE DETECTED */
   /*----------------------*/
   IF EXNOISE=2 THEN DO ;
      OK=0 ;
      DO II=0 TO 199 ;    SIGNAL(II)=0 ;    END ;
      DO II=3 TO 249 ;
         TMP=INTGRL(II) ;
         IF TMP¢TAN2(II) THEN TMP=TMP-TAN2(II) ;
                              ELSE TMP=0 ;
         IF TMP¢199 THEN TMP=199 ;
         SIGNAL(TMP)=SIGNAL(TMP)+1 ;
      END ;
      MM=0 ;
```

```
   DO II=2 TO 199 ;
      NOISE2=NOISE(II) ;
      TMP=SIGNAL(II) ;
      IF TMP¢NOISE2 THEN MM=MM+TMP-NOISE2 ;
         ELSE DO ;
              NN=NOISE2-TMP ;
                      IF NN¢MM THEN MM=0 ;
                      ELSE MM=MM-NN ;
         END ;
   END ;

IF ((MM¢THRESHOLD) AND (CNTDET¢2)) THEN DO ;
      ALARM=1 ;
      DETTYPE=3 ;
      RETURN ;
   END ;
END ;

/* NO NOISE DETECTED */
   /*-------------------*/
   IF EXNOISE=0 THEN DO ;
      DO II=3 TO 249 ;
         TMP=INTGRL(II) ;
         INTGRL32(II)=INTGRL32(II)+TMP ;
         IF TMP¢REF_MAX14(II) THEN DETECTIONS(II)=1 ;
                  ELSE DETECTIONS(II)=0 ;
      END ;
   IF CNTEMPTY¢2 THEN DO ;
      ALARM=1 ;
      DETTYPE=6 ;
      RETURN ;
   END ;
   JJ=JJ+1 ;
   CALL CHECK ;
   IF OK=1 THEN DO ;
      IF CNTTAN=0 THEN NODET=0 ;
      IF ((CNTTAN¢0) AND (CNTTAN_20)) THEN DO ;
         NODET=NODET+1 ;
         IF NODET¢5 THEN DO ;
            CNTTAN=0 ;
            PERIOD=47 ;
            NODET=0 ;
         END ;
      END ;
      IF CNTTAN¢60 THEN DO ;
         NODET=NODET+1 ;
         IF NODET¢20 THEN ENDTAN=CNTTAN ;
      END ;
      IF CNTDET¢0 THEN OK=0 ;
   END ;
   ELSE DO ;
      DETTYPE=4 ;
      NODET=0 ;
/*       IF CNTDET=1 THEN ALARM=0 ;
   ELSE*/ IF ((CNTTH¢200) AND (PERIOD=0) AND
   ((REF_NOISE_3500) OR (CNTTAN¢0)))
           THEN DO ;
              DO II=3 TO 249 ;
```

```
                        TMP=SHR(INTGRL(II),1)+SHR(INTGRL(I1),3) ;
                        IF TMP¢TAN2(II) THEN DETECTIONS(II)=1 ;
                                    ELSE DETECTIONS(II)=0 ;
                END ;
                CALL CHECK ;
                IF OK=1 THEN DO ;
                    IF CNTTAN=0 THEN DO ;
                        CNTTAN=1 ;
                        THRESHOLD=10;
                        TH(0)=12 ; TH(1)=8 ; TH(2)=6 ; TH(3)=5 ;
                    END ;
                    OK=0 ;
                    DO II=3 TO 249 ;
                        IF INTGRL(II)¢TAN1(II) THEN
                        TAN1(II)=INTGRL(II) ;
                        IF DETECTIONS(II)=1 THEN
                        TAN1(II)=TAN1(II)+SHR(TAN1(II),1)

END ;
                END ;
                ELSE DO ;
                        ALARM=1 ;
                        RETURN ;
                END ;
            END ;
            ELSE DO ;
                    ALARM=1 ;
                    RETURN ;
            END ;
      END ;
      IF JJ=8 THEN DO ;
          JJ=0 ;
          FF=OK ;
          IF ((REF_NOISE¢3500) AND (CNTTAN=0) AND (PERIOD=0)
             AND (CNTTH¢50)) THEN DO ;
              DO II=3 TO 249 ;
                  NN=INTGRL32(II) ;
                  IF NN¢REF_MAX132(II) THEN DETECTIONS(II)=1 ;
                                  ELSE DETECTIONS(II)=0 ;
              END ;
              CALL CHECK ;
              IF OK=1 THEN DO ;
                  CALL RENEW32 ;
                  OK=FF ;
              END ;
              ELSE DO ;
                      ALARM=1 ;
                      DETTYPE=5 ;
                      RETURN ;
              END ;
          END ;
          ELSE DO ;
                  CALL RENEW32 ;
          END;
      END ;
  END ;
  IF OK=1 THEN DO ;
      CALL RENEW4 ;
  END ;
END DETECTT ;
```

```
STUDY_MASK : PROCEDURE ;
   MASKCNT1=0 ;
   MASKCNT2=0 ;
   CALL XMT ;
   CALL RCV(.TMP1) ;                            /* MEASURING THE   */
   DO II=0 TO 7;                                /* MASK REFERENCE  */
      IF V60_15=0 THEN MASKHIGH(II)=TMP1(II) ;
                 ELSE MASKLOW(II)=TMP1(II) ;
   END ;
END STUDY_MASK ;
IE=0 ;
TCON=0 ;
P1=93H ;
P3=0E4H ;

MM=0 ;
OK=1 ;
DO WHILE ((OK=1) AND (MM_8192)) ;              /* MEMORY CHECK */
   TMP1(MM)=0FFH ;
   IF TMP1(MM)_¢0FFH THEN OK=0 ;
   TMP1(MM)=0 ;
   IF TMP1(MM)_¢0 THEN OK=0 ;
   MM=MM+1 ;
END ;
IF OK=0 THEN DO ;
   LED=1 ;
   DO WHILE(1) ;
   END ;
END ;

ZONE(0)=3 ;ZONE(1)=85 ;ZONE(2)=140 ;ZONE(3)=200 ;
LOWZONE=250 ;HIGHZONE=250 ;DISTANCE=250 ;OKLOW=250 ;WALK=250 ;

DO II=1 TO SECONDS ;
   LED=1 ;
   CALL TIM(25000) ;
   LED=0 ;
   CALL TIM(25000) ;
END ;

CALL STUDY_MASK ;            /* STUDY LOW VOLTAGE MASK */

RSW=1 ;
V60_15=0 ;
DO II=1 TO 10 ;
   CALL TIM(50000) ;
END ;
CALL STUDY_MASK ;            /* STUDY HIGH VOLTAGE MASK */

OK=1 ;
DO WHILE(OK=1) ;
   CALL RCV(.RAASH1) ;
      NLEVEL=RAASH1(20) ;                      /* MEASURING THE */
      DO II=20 TO 220 ;                        /* NOISE LEVEL   */
         IF NLEVEL¢RAASH1(II) THEN NLEVEL=RAASH1(II) ;
      END ;
      NLEVEL=NLEVEL+1 ;
      IF NLEVEL¢20 THEN CALL SIREN ;
                   ELSE OK=0 ;
```

```
    END ;

ALARM=1 ;
    DO WHILE(ALARM=1) ;
        CALL STUDY ;
        IF ALARM=1 THEN DO ;
            CALL SIREN ;
            DO II=0 TO 30 ;CALL TIM(50000)  ;END ;
        END ;
    END ;

LED=1 ;
DETHIGH=0 ;
DO WHILE(DETHIGH_30) ;
    CALL DETECTT ;
    DETHIGH=DETHIGH+1 ;
    IF ALARM=1 THEN DETHIGH=50 ;
END ;

IF DETHIGH=50 THEN DO ;                         /*   LOWZONE DETECTION */
    DETHIGH=0 ;
    DETLOW=0 ;
    LED=0 ;
    OKLOW=DISTANCE ;
    DO WHILE(DETHIGH_30) ;
        CALL DETECTT ;
        DETHIGH=DETHIGH+1 ;
        IF ALARM=1 THEN DO ;
            IF ((DISTANCE¢OKLOW-5) AND (DISTANCE_OKLOW+5))
                THEN DETLOW=DETLOW+1 ;
                ELSE DETLOW=0 ;
            OKLOW=DISTANCE ;
            IF DETLOW¢2 THEN DO ;
                DETHIGH=50 ;
                LED=1 ;
                DO II=0 TO 1 ;CALL TIM(50000) ;END ;
                LED=0 ;
            END ;
        END ;
    END ;
END ;
IF DETHIGH_¢50 THEN OKLOW=250 ;

IF DETHIGH=50 THEN DO ;                         /* HIGHZONE DETECTION */
    DETHIGH=0 ;
    DETLOW=0 ;
    DO WHILE(DETHIGH_30) ;
        CALL DETECTT ;
        DETHIGH=DETHIGH+1 ;
        IF ALARM=1 THEN DO ;
            IF ((DISTANCE¢WALK-5) AND (DISTANCE_WALK+5))
                THEN DETLOW=DETLOW+1 ;
                ELSE DETLOW=0 ;
            WALK=DISTANCE ;
            IF DETLOW¢2 THEN DO ;
                DETHIGH=50 ;
                LED=1 ;
                DO II=0 TO 1 ;CALL TIM(50000) ;END ;
                LED=0 ;
```

```
            END ;
         END ;
      END ;
END ;
IF DETHIGH_¢50 THEN WALK=250 ;

IF OKLOW¢WALK THEN DO ;
   LOWZONE=WALK ;
   HIGHZONE=OKLOW ;
END ;
ELSE DO ;
   LOWZONE=OKLOW ;
   HIGHZONE=WALK ;
END ;

DO II=LOWZONE TO HIGHZONE ;
   EMPTY(II)=1 ;
END ;

LED=0 ;
CALL TIM(50000) ;
CALL TIM(50000) ;

DETHIGH=0 ;
DETLOW=0 ;
OKLOW=0 ;
WALK=1 ;
DO WHILE(1) ;
IF V60_15=0 THEN DO ;                         /* HIGH VOLTAGE */
   CALL DETECTT ;
   IF DETHIGH¢0 THEN DETHIGH=DETHIGH+1 ;
   IF ALARM=1 THEN DO ;
      IF DETHIGH=0 THEN DETHIGH=1 ;
      CALL SIREN ;
      PERIOD=1 ;
      IF MASKCNT1=1 THEN DETHIGH=DETHIGH+20 ;
   END ;
   IF (((WALK=0) AND (DETHIGH¢20)) OR DETHIGH¢100) THEN DO ;
      V60_15=1 ;
      RSW=0 ;
      DETLOW=0 ;
      OKLOW=0 ;
      WALK=0 ;
      DO II=0 TO 30 ;CALL TIM(50000) ;END ;
      ALARM=1 ;
      DO WHILE(ALARM=1) ;
         CALL STUDY ;
         IF ALARM=1 THEN DO ;
            CALL SIREN ;
            DO II=0 TO 30 ;CALL TIM(50000) ;END ;
         END ;
      END ;
      CALL STUDY_MASK ;
   END ;
END ;
ELSE DO ;        /* LOW VOLTAGE */
   CALL DETECTT ;
   IF ALARM=1 THEN DO ;
```

```
         CALL SIREN ;
         PERIOD=1 ;
         IF MASKCNT1_¢1 THEN DETLOW=DETLOW+1 ;
                       ELSE DO ;
                              DETLOW=0 ;
                              DO II=0 TO 30 ;CALL TIM(50000) ;
                              END ;
                       END ;
         OKLOW=0 ;
         IF DETLOW¢100 THEN DO ;
            DETLOW=0 ;
            ALARM=1 ;
            DO WHILE(ALARM=1) ;
               CALL STUDY ;
               IF ALARM=1 THEN DO ;
                  CALL SIREN ;
                  DO II=0 TO 30 ;CALL TIM(50000)    ;END ;
               END ;
            END ;
         END ;
      END ;
      ELSE DO ;
         OKLOW=OKLOW+1 ;
         DETLOW=0 ;
         IF OKLOW¢100 THEN DO ;
            RSW=1 ;
            V60_15=0 ;
            DETHIGH=0 ;
            OKLOW=0 ;
            DO II=0 TO 30 ;CALL TIM(50000) ;END ;
                       ALARM=1 ;
                       DO WHILE(ALARM=1) ;
                          CALL STUDY ;
                          IF ALARM=1 THEN DO ;
                             CALL SIREN ;
                             DO II=0 TO 30 ;CALL TIM(50000) ;END ;
                          END ;
                       END ;
                       CALL STUDY_MASK ;
               END ;
            END ;
         END ;
   END ;

END OPERATE ;
```

What is claimed is:

1. An intrusion detection apparatus, comprising:

(A) means including an antenna for transmitting spaced pulses of radiation energy of a given frequency throughout a region to be protected;

(B) means for receiving radiation energy reflected from the protected region, said reflected radiation energy being received between adjacent spaced pulses in the form of an AC analog signal at said given frequency, the peaks and valleys of which signal vary in amplitude with time;

(C) means for allocating a portion of the time occurring between transmitted pulses into a plurality of time segments each of which segments is long enough to correspond to at least one cycle of said analog signal;

(D) means for integrating the portion of the signal in each of said time segments to arrive at an integral value for each of said segments;

(E) means for converting said integral values into corresponding digital values;

(F) means for storing said digital values in memory;

(G) means for comparing the stored digital values obtained from the reflected energy of a first transmitted pulse with the corresponding digital values obtained from the reflected energy of an adjacent second transmitted pulse;

(H) means for storing the absolute differences obtained between corresponding integral values for each of said time segments; and, (I) means responsive to predetermined changes in said absolute differences for a predetermined number of time segments for initiating an intrusion signal in said apparatus.

2. An intrusion detection apparatus according to claim 1, wherein each of said segments is long enough to correspond to a plurality of cycles of said AC analog signal, and further including means for rectifying said AC analog signal into a variable DC voltage prior to integrating said plural cycles in each of said time segments.

3. An intrusion detection apparatus according to claim 2, wherein said radiation energy comprises ultrasonic energy.

4. An intrusion detection apparatus according to claim 3, wherein said apparatus transmits about 6 spaced apart pulses of said ultrasonic energy per second, each of said pulses including about 12 cycles of said ultrasonic energy.

5. An intrusion detection apparatus according to any one of claims 1-4, further including means operative during an initial start up period of the apparatus for taking and storing the values of reflected energy received from a distance of up to about 2 feet away from said antenna, and means operative during subsequent first listening periods corresponding to the return of reflected energy from a distance of up to about 2 feet away from said antenna for comparing the subsequently received values of reflected energy with said stored values and for determining whether or not an attempt has been made to mask the transmission of radiation energy to the protected region.

6. An intrusion detection apparatus according to any one of claims 1-4, wherein said means for receiving radiation energy reflected from the protected region is operative during a listening period corresponding to the return of reflected energy from a distance of up to about 41 feet away from said antenna.

7. An intrusion detection apparatus according to claim 5, wherein said means for receiving radiation energy reflected from the protected region is operative during a second listening period corresponding to the return of reflected energy from a distance in the range from about 2 feet to about 41 feet from said antenna.

8. An intrusion detection apparatus according to any one of claims 1-4, further including means operative during a listening period preceding each of said pulses for determining the background noise level extant in said protected region.

9. An intrusion detection apparatus according to claim 5, further including means operative during another listening period for determining the background noise level extant in said protected region, said listening period preceding each of said pulses.

10. An intrusion detection apparatus according to claim 6, further including means operative during another listening period for determining the background noise level extant in said protected region, said listening period preceding each of said pulses.

11. An intrusion detection apparatus according to claim 7, further including means operative during a third listening period preceding each of said pulses for determining the background noise level extant in said protected region.

12. An intrusion detection apparatus according to any one of claims 1-4, wherein said time allocating means allocates a portion of the time between transmitted pulses into at least about 200 time segments each of which is long enough to correspond to at least three cycles of said analog signal.

13. An intrusion detection apparatus according to claim 12, wherein each of said time segments is long enough to correspond to about seven cycles of said analog signal.

14. An intrusion detection apparatus according to claim 6, wherein said time allocating means allocates a portion of the time during said listening period into at least about 200 time segments each of which is long enough to correspond to at least three cycles of said analog signal.

15. An intrusion detection apparatus according to claim 14, wherein each of said time segments is long enough to correspond to about seven cycles of said analog signal.

16. An intrusion detection apparatus according to claim 7, wherein said time allocating means allocates the time during said second listening period into at least about 200 time segments each of which is long enough to correspond to at least three cycles of said analog signal.

17. An intrusion detection apparatus according to claim 16, wherein said time allocating means allocates the time during said second listening period into about 250 time segments each of which is long enough to correspond to about seven cycles of said analog signal.

18. An intrusion detection apparatus according to any one of claims 1-4, wherein said first and second adjacent transmitted pulses comprise a first pair of transmitted pulses, and further including means for comparing the stored digital values, obtained from the reflected energy from one transmitted pulse on each of respectively adjacent second, third, fourth and fifth pairs of transmitted pulses, with the corresponding stored digital data value, obtained from the respective reflected energy from the other transmitted pulse in each of said second, third, fourth and fifth pairs of transmitted pulses, to obtain five absolute differences between corresponding integral values of the paired reflected energy responses for each of said time segments; means for summing said five absolute differences for each time segment to obtain a second integral value for each time segment; and means for storing said second integral value for each time segment.

19. An intrusion detection device according to claim 18, wherein said five pairs of adjacent transmitted pulses comprise ten transmitted pulses in a row, and wherein said second pair of pulses comprises a third and a fourth pulse, said third pair of pulses comprises a fifth and a sixth pulse, said fourth pair of pulses comprises a seventh and an eighth pulse, and said fifth pair of pulses comprises a ninth and a tenth pulse.

20. An intrusion detection device according to claim 18, wherein said five pairs of adjacent transmitted pulses comprise six transmitted pulses in a row, and wherein said second pair of pulses comprises said second and a third pulse, said third pair of pulses comprises said third and a fourth pulse, said fourth pair of pulses comprises said fourth and a fifth pulse, and said fifth pair of pulses comprises a fifth and a sixth pulse.

21. An intrusion detection apparatus according to claim 18, further including means for repetitively obtaining said second integral values for about 100 groups of five paired reflected energy responses; means for selecting and storing the highest and second highest second integral values obtained for each time segment during the latest 100 groups of said five paired reflected energy responses; means for comparing the latest second integral value at each time segment with said highest stored second integral value; and, means for triggering an alarm circuit when the highest stored second integral values of more than a predetermined number of said time segments are exceeded by the latest series of second integral values to be stored.

22. An intrusion detection apparatus according to claim 21, wherein the number of second integral values in the latest series of second integral values to be stored, which must exceed the highest previously stored second integral values in order to trigger the alarm, decreases as the distance of the time segments involved increases relative to the transmitted pulse.

23. An intrusion detection apparatus according to any one of claims 1-4, further including means for comparing the stored digital values, obtained from the reflected energy of respectively adjacent third through about thirty-first transmitted pulses, with the corresponding stored digital data values, obtained from the respective reflected energy of said second through about the thirtieth transmitted pulses, to obtain about thirty absolute differences between corresponding integral values of paired reflected energy responses for each of said time segments; means for summing said about thirty absolute differences for each time segment to obtain a second integral for each of said segments; and means for storing said second integral value for each time segment.

24. An intrusion detection apparatus according to claim 23, further including means for repetitively updating said second integral value for each time segment so that said second integrals represent the sums of the latest about 30 absolute differences for each time segment; and means responsive to predetermined changes in said second integral values for triggering an alarm circuit that signifies that an extremely slow intrusion movement is occurring in the protected region.

25. An intrusion detection apparatus according to any one of claims 1-4, further including means operative to reduce the sensitivity of said reflected radiation receiving means with respect to signals reflected from selected parts of the protected region for inhibiting false intrusion signals from initiating in said selected parts of the protected region.

26. An intrusion detection apparatus according to claim 25, wherein said false intrusion signal inhibiting means includes means operative during selectable ones of said time segments for precluding excessive reflected signal responses from initiating intrusion signals during such time segments.

27. An intrusion detection apparatus according to any one of claims 1-4, wherein said reflected radiation receiving means includes at least two receivers spaced apart from one another, and further including vectoring means in circuit with said receivers for providing an indication of the azimuthal location of an intrusion signal source within said protected region.

28. An intrusion detection apparatus according to claim 27, wherein said reflected radiation receiving means includes a third receiver, and wherein said vectoring means further includes means for providing an indication of the elevation of said intrusion signal source within said protected region.

29. An intrusion detection device according to claim 28, wherein said two receivers are coplanar in a substantially horizontal plane, and wherein said third receiver is vertically spaced apart from the plane of said two receivers.

30. An intrusion detection apparatus according to any one of claims 1-4, wherein said intrusion signal initiating means is responsive to the distance of an intruder from said antenna.

31. An intrusion detection apparatus according to any one of claims 1-4, further including means in circuit with said pulse transmitting means and operable when actuated to reduce the power level of said transmitted pulses for inhibiting the generation of undesirable noise levels in the protected region when said region is occupied by personnel.

32. An intrusion detection apparatus according to any one of claims 1-4, further including means responsive to the occurrence of a predetermined drop in the level of reflected radiation energy received from beyond a selected time segment for triggering an alarm signal signifying an attempt to block the operation of said apparatus.

33. An intrusion detection apparatus according to any one of claims 1-4, further including means responsive to the rate of change of said integral values of said time segments and adapted to compare said rates of change with predetermined rates of change of said values for inhibiting the triggering of an alarm signal when said rates of change do not exceed said predetermined rates of change, to thereby prevent false alarm signals from occurring due to changes in air flow patterns in the protected region.

34. A method of intrusion detection comprising the steps of:

(A) transmitting spaced pulses of radiation energy of a given frequency throughout a region to be protected;

(B) receiving reflected radiation energy from the protected region between adjacent spaced pulses, said reflected radiation energy being received in the form of an AC analog signal the peaks and valleys of which signal vary in amplitude with time;

(C) allocating a portion of the time occurring between transmitted pulses into a plurality of time segments each of which segments is long enough to correspond to at least one full cycle of said analog signal;

(D) integrating the portion of the signal in each of said time segments to arrive at an integral value for each of said segments;

(E) converting said integral values into corresponding digital values;

(F) storing said digital values in memory;

(G) comparing the stored digital values obtained from the reflected energy of a first transmitted pulse with the corresponding stored digital values obtained from the reflected energy of an adjacent second transmitted pulse;

(H) storing the absolute differences obtained between corresponding integral values for each of said time segments; and, (I) initiating an intrusion signal in the event changes of a predetermined amount occur in said absolute differences for a predetermined number of time segments.

35. A method of intrusion detection according to claim 34, wherein each of said segments is long enough to correspond to a plurality of cycles of said AC analog signal, and further including the step of rectifying said AC analog signal into a variable DC voltage prior to integrating said plural cycles in each of said time segments.

36. A method of intrusion detection according to claim 35, wherein said radiation energy comprises ultrasonic energy.

37. A method of intrusion detection according to claim 36, wherein the pulse repetition rate of said spaced pulses is about 6 pulses per second, and wherein each of said pulses includes about 12 cycles of said ultrasonic energy.

* * * * *

UNITED STATES PATENT AND TRADEMARK OFFICE
CERTIFICATE OF CORRECTION

PATENT NO. : 4,875,198

DATED : October 17, 1989

INVENTOR(S) : Arie Ariav

It is certified that error appears in the above-identified patent and that said Letters Patent is hereby corrected as shown below:

Column 3, line 27, "FIG. 15" should read --FIG. 5--.

Column 4, line 45, after "these" insert --signals and pass the integrated signals along to a--.

Column 4, line 46, after "received" insert --signals into a stream of integrated values for the received DC--.

Column 4, line 48, after "signals" insert --are--.

Column 4, line 49, "time" should read --timed--.

Column 5, line 62, "may" (second occurrence) should read --any--.

Column 6, line 3, after "processing" insert --unit--.

Column 6, line 41, after "RAM" insert --unit--.

Column 16, the paragraphs beginning "A print-out of" and "After approximately 10 minutes" should be reversed.

Column 16, line 40, after "more" insert --adjacent pairs of second interval values REF are exceeded between time segment No. 155 and time segment No. 250 the alarm will trigger; and finally, if 3 or more adjacent pairs of second integral values REF are exceeded between time segment No 197 and time segment No. 250, the alarm will trigger.

A print-out of a suitable software program that may be used to control the operation of the timing and control circuits 1 of the detector has been set forth in TABLE I which follows. The software program of TABLE I is based on Intel's "PLM51" high level language and Intel's "ASM51" machine language. The program generally appears on the left side of TABLE I and descriptive

UNITED STATES PATENT AND TRADEMARK OFFICE
CERTIFICATE OF CORRECTION

PATENT NO. : 4,875,198

DATED : October 17, 1989

INVENTOR(S) : Arie Ariav

It is certified that error appears in the above-identified patent and that said Letters Patent is hereby corrected as shown below:

comments with respect to various of the algorithms appear primarily on the right side of TABLE I. The comments appear in the form "/*...*/" to distinguish them from lines of the program.--

Column 16, lines 40 and 41, cancel "modifications as fall within the true spirit and scope of the invention".

Column 47, prior to the claims, insert --It will be apparent from the foregoing description that this invention provides an improved intrusion detection apparatus and method in which the number of false alarms generated by spurious noise and non-intruder-originated movements in the protected region is significantly reduced from the number of spurious false alarms generated by intrusion detection apparatus and methods heretofore used. The intrusion detector and method include improved provisions therein for detecting attempts to mask, as well as to block, the operation of the detector, and includes improved provisions for excluding from protection selected zones within the protected region. The detector and method also have improved provisions for compensating for and ignoring ambient environmental changes, and provisions employing real time integration to increase the probability of and to improve the repeatability of the generation of detection signals therein.

While there have been shown and described what are presently considered to be the preferred embodiments of this invention, it will be obvious to those skilled in the art that various changes and modifications may be made without departing from the broader aspects of this invention. It is,

UNITED STATES PATENT AND TRADEMARK OFFICE
CERTIFICATE OF CORRECTION

PATENT NO. : 4,875,198

DATED : October 17, 1989

INVENTOR(S) : Arie Ariav

It is certified that error appears in the above-identified patent and that said Letters Patent is hereby corrected as shown below:

therefore, aimed in the appended claims to cover all such changes and modifications as fall within the true spirit and scope of this invention.--

Signed and Sealed this

Twelfth Day of November, 1991

*Attest:*

HARRY F. MANBECK, JR.

*Attesting Officer*     *Commissioner of Patents and Trademarks*